US008568808B2

(12) United States Patent
Grah et al.

(10) Patent No.: US 8,568,808 B2
(45) Date of Patent: Oct. 29, 2013

(54) INTERCALATED LAYERED SILICATE

(75) Inventors: Michael D. Grah, Greenville, SC (US);
Michael L. Becraft, Greer, SC (US);
Drew V. Speer, Simpsonville, SC (US);
Gary W. Beall, San Marcos, TX (US);
Jeremy Bartels, University City, MO (US)

(73) Assignee: Cryovac, Inc., Duncan, SC (US)

( * ) Notice: Subject to any disclaimer, the term of this patent is extended or adjusted under 35 U.S.C. 154(b) by 1169 days.

(21) Appl. No.: 11/667,424

(22) PCT Filed: Dec. 2, 2005

(86) PCT No.: PCT/US2005/043741
§ 371 (c)(1),
(2), (4) Date: Oct. 26, 2009

(87) PCT Pub. No.: WO2006/060716
PCT Pub. Date: Jun. 8, 2006

(65) Prior Publication Data
US 2010/0040653 A1 Feb. 18, 2010

Related U.S. Application Data

(63) Continuation-in-part of application No. 11/002,615, filed on Dec. 2, 2004, now abandoned.

(51) Int. Cl.
| C04B 14/00 | (2006.01) |
| C09C 1/28 | (2006.01) |
| C08K 3/34 | (2006.01) |
| A61K 8/04 | (2006.01) |
| A61K 9/10 | (2006.01) |
| C09D 11/00 | (2006.01) |
| C10M 169/04 | (2006.01) |
| B65D 85/72 | (2006.01) |

(52) U.S. Cl.
USPC ........ 426/106; 106/31.13; 106/415; 106/416; 252/378 R; 424/401; 424/484; 508/136; 524/442; 524/444; 524/445; 524/447

(58) Field of Classification Search
USPC ......... 423/447.2; 252/378 R; 106/31.13, 415, 106/416; 524/442, 444, 445, 447; 424/401, 424/484; 508/136; 426/106
See application file for complete search history.

(56) References Cited

U.S. PATENT DOCUMENTS 4,048,378 A 9/1977 Pelzek
(Continued)

FOREIGN PATENT DOCUMENTS

CN 1485364 3/2004
(Continued)

OTHER PUBLICATIONS

Office action mailed Nov. 12, 2008 of abandoned U.S. Appl. No. 11/002,615, filed Dec. 2, 2004 and published as U.S. 2006-0122309 A1.

*Primary Examiner* — Wayne Langel
(74) *Attorney, Agent, or Firm* — Daniel B. Ruble

(57) ABSTRACT

An intercalated layered silicate comprises a layered silicate and an intercalating agent sorbed between the silicate layers of the layered silicate. The amount of intercalating agent is effective to provide an average interlayer spacing between the silicate layers of at least about 20 Å. The intercalating agent has a formula selected from formulas I through VII described herein. The intercalated layered silicate may be exfoliated by mixing it with a matrix medium and adding sufficient energy to form a dispersed-particle composition. A packaging film, such as a food packaging film, may comprise the dispersed-particle composition.

59 Claims, 10 Drawing Sheets

(56) References Cited

U.S. PATENT DOCUMENTS

| | | |
|---|---|---|
| 5,358,647 A | 10/1994 | Puentes-Bravo et al. |
| 5,670,139 A | 9/1997 | Allard et al. |
| 5,760,121 A | 6/1998 | Beall et al. |
| 5,804,613 A | 9/1998 | Beall et al. |
| 5,830,528 A | 11/1998 | Beall et al. |
| 5,880,197 A | 3/1999 | Beall et al. |
| 5,952,095 A | 9/1999 | Beall et al. |
| 5,969,092 A | 10/1999 | Karvo |
| 5,998,528 A | 12/1999 | Tsipursky et al. |
| 6,057,035 A | 5/2000 | Singh et al. |
| 6,083,559 A | 7/2000 | Beall et al. |
| 6,242,500 B1 | 6/2001 | Lan et al. |
| 6,287,634 B1 | 9/2001 | Beall et al. |
| 6,461,423 B1 | 10/2002 | Beall et al. |
| 6,864,308 B2 | 3/2005 | Rosenthal et al. |
| 2002/0169246 A1 | 11/2002 | Barbee et al. |
| 2003/0232912 A1 | 12/2003 | Rosenthal et al. |
| 2006/0122309 A1 | 6/2006 | Grah et al. |

FOREIGN PATENT DOCUMENTS

| | | |
|---|---|---|
| CN | 1485372 | 3/2004 |
| EP | 0 668 071 B1 | 9/1996 |
| EP | 0 780 340 A1 | 6/1997 |
| KR | 2004-054902 | 6/2004 |
| WO | WO 97-31057 A | 8/1997 |
| WO | WO 03-106549 A | 12/2003 |

INTERCALATED LAYERED SILICATE

This is a continuation-in-part patent application under 35 U.S.C. §120 of prior U.S. patent application Ser. No. 11/002,615 filed Dec. 2, 2004 now abandoned by Grah et al, which is incorporated herein in its entirety by reference.

BACKGROUND OF THE INVENTION

The present invention relates to intercalated layered silicates and to dispersed-particle compositions comprising silicate platelets exfoliated from intercalated layered silicates.

Intercalated clays may be made using a quaternary ammonium-based intercalating agent. However, it may be difficult to obtain government agency approval to utilize quaternary ammonium-based intercalating agents in some end-use applications, such as food-contacting materials. Further, quaternary ammonium-based intercalating agents may show an unacceptably high amount of decomposition at the processing resident times and temperatures desired for processing a matrix medium incorporating the quaternary ammonium-based intercalating agent.

SUMMARY OF THE INVENTION

One or more embodiments of the present invention may address one or more of the aforementioned problems.

An intercalated layered silicate comprises a layered silicate and an intercalating agent sorbed between the silicate layers of the layered silicate. The amount of intercalating agent is effective to provide an average interlayer spacing between the silicate layers of at least about 20 Å. The intercalating agent has a formula selected from formulas I through VII as described below.

The intercalated layered silicate may be exfoliated by mixing it with a matrix medium and adding sufficient energy to form a dispersed-particle composition. A packaging film, such as a food packaging film, may comprise the dispersed-particle composition.

These and other objects, advantages, and features of the invention will be more readily understood and appreciated by reference to the detailed description of the invention.

DETAILED DESCRIPTION OF THE INVENTION

Figure 1:
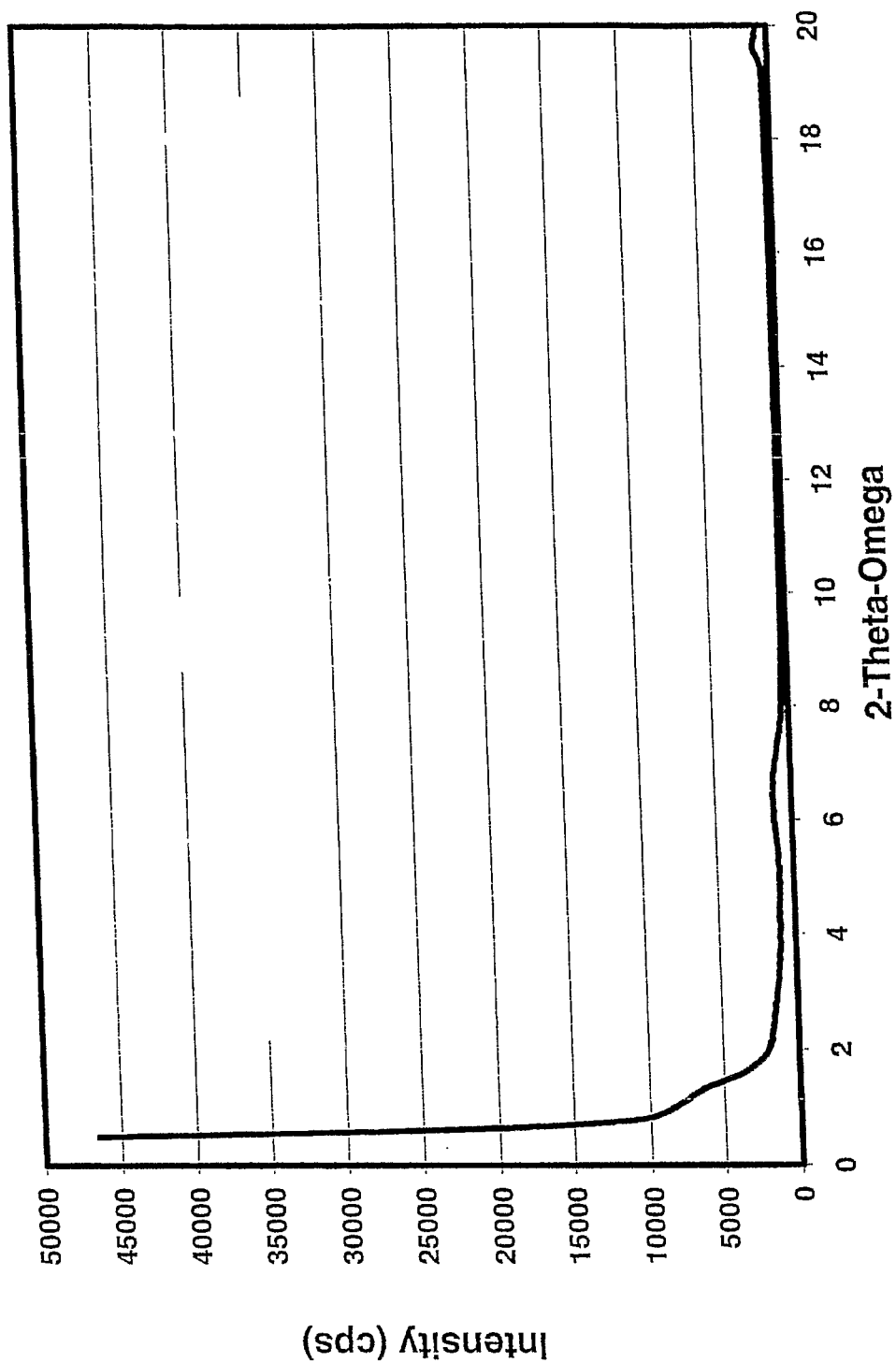
FIG. 1 is an X-ray diffraction pattern for montmorillonite clay intercalated with a blend of pentaerythritol stearates, as discussed in Example 1.

An intercalated layered silicate comprises a layered silicate comprising a plurality of silicate layers. At least one intercalating agent is sorbed between the silicate layers in an amount effective to provide an average interlayer spacing between the silicate layers of at least about 20 Å.

Layered Silicate

The intercalated layered silicate comprises a layered silicate. The layered silicate (i.e., phyllosilicate) may be naturally occurring or synthetically derived. Exemplary layered silicates include:

1. Natural clays such as smectite clays, for example, bentonite clays (e.g., montmorillonite, hectorite), mica, vermiculite, nontronite, beidellite, volkonskoite, and saponite;

2. Layered polysilicates (e.g., layered silicic acid), such as kanemite, makatite, ilerite, octosilicate, magadiite, and kenyaite; and 3. Synthetic clays, such as, synthetic silicates, synthetic mica, synthetic saponite, synthetic laponite, and synthetic hectorite.

Layered silicates comprise a plurality of silicate layers, that is, a laminar structure having a plurality of stacked silicate sheets or layers with a variable interlayer distance between the layers. For example, the layered silicate may have a 2:1 layer structure typified by a central octahedral layer, comprising aluminum oxide sandwiched between two tetrahedral silicate layers. The aluminum of the oxide may also be substituted by any of magnesium, iron, chromium, manganese, or lithium. When substitutions occur between ions of unlike charge, excess negative charge may develop on the corresponding part of the silicate structure. This excess negative charge may be compensated by a positive ion such as Na+ that associates with that area on the silicate. The layers of the layered silicate may be turbostratic relative to each other, such that the layered silicate may be swellable, for example, in water. The average thickness of the silicate layers may be at least about any of the following: 3, 5, 8, 10, 15, 20; 30, 40, and 50 Å; and at most about any of the following: 60, 50, 45, 35, 25, 20, 15, 12, 10, 8, and 5 Å. For example, many layered silicates have a silicate layer thickness ranging from 8 to 11 Å.

The average interlayer spacing of the layered silicate at 60% relative humidity before intercalation with the intercalating agent may be at least about any of the following: 1, 2, 3, 4, 5, 6, 8, and 10 Å; and may be at most about any of the following: 20, 15, 10, 8, 6, 5, 3, and 2 Å.

The average interlayer spacing (i.e., the gallery spacing) of a layered silicate (including an intercalated layered silicate) refers to the distance between the internal faces of the non-exfoliated, adjacent layers of representative samples of the layered silicate. The interlayer spacing may be calculated using standard powder wide angle X-ray diffraction techniques generally accepted in the art in combination with Bragg's law equation, as is known in the art.

Useful layered silicates are available from various companies including Nanocor, Inc., Southern Clay Products, Kunimine Industries, Ltd., Elementis Pigments, and Rheox.

Intercalating Agent

The intercalated layered silicate comprises at least one intercalating agent sorbed between the silicate layers of the layered silicate. The term "sorbed" in this context means inclusion within the layered silicate (for example, by adsorption and/or absorption) without covalent bonding. An intercalating agent that is sorbed between silicate layers may be held to the interlayer surface of a silicate layer by one or more of ionic complexing, electrostatic complexing, chelation, hydrogen bonding, ion-dipole interaction, dipole-dipole interaction, and van der Waals forces.

The intercalating agent may have any one or more of the following formulas:

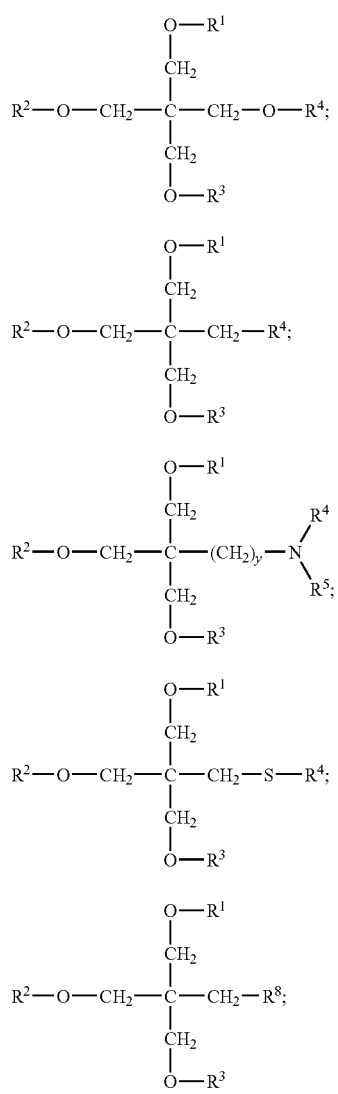

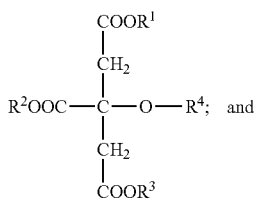

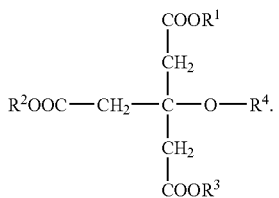

$R^4$ may represent an acyl group, for example, an acyl group having at least any of 8, 10, 12, 14, and 16 carbon atoms; and/or at most any of 30, 28, 26, 24, 22, 20, 18, 16, 14, 12, and 10 carbon atoms. The acyl group may be branched or unbranched. The acyl group may be saturated or unsaturated (for example, with any of one, two, three, or at least four units of unsaturation);

$R^4$ may represent an alkyl group, for example, an alkyl group having at least any of 8, 10, 12, 14, and 16 carbon atoms; and/or at most any of 30, 28, 26, 24, 22, 20, 18, 16, 14, 12, and 10 carbon atoms. The alkyl group may be branched or unbranched;

$R^4$ may represent an alkenyl group, for example, an alkenyl group having at least any of 8, 10, 12, 14, and 16 carbon atoms; and/or at most any of 30, 28, 26, 24, 22, 20, 18, 16, 14, 12, and 10 carbon atoms. The alkenyl group may be branched or unbranched;

$R^4$ may represent an alkadienyl group, for example, an alkadienyl group having at least any of 8, 10, 12, 14, and 16 carbon atoms; and/or at most any of 30, 28, 26, 24, 22, 20, 18, 16, 14, 12, and 10 carbon atoms. The alkadienyl group may be branched or unbranched.

$R^4$ may represent a carbon chain group (branched or unbranched), for example having at least any of 8, 10, 12, 14, and 16 carbon atoms; and/or at most any of 30, 28, 26, 24, 22, 20, 18, 16, 14, 12, and 10 carbon atoms, where the carbon chain group incorporates one or more pendant or terminal groups selected from each of a hydroxyl group, a carboxyl group, an epoxy group, an isocyanate group, an aryl group (e.g., a phenyl group or a tolyl group), and an arylmethyl group having the formula

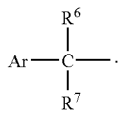

"Ar" represents an aryl group. $R^6$ and $R^7$ may each independently represent a hydrogen, an acyl group, an alkyl group, or an alkenyl group.

$R^5$ may represent any of H, —$CH_3$, —$CH_2CH_3$, and any of the groups represented by $R^4$.

$R^8$ may represent oxylated groups selected from any one or more of the following formulas:

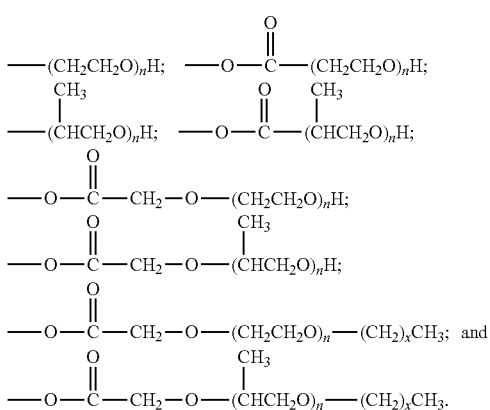

In the above formulas, "n" may be at least any of the following values: 2, 4, 5, 6, 8, 10 and/or at most any of the following values: 6, 8, 10, 12; for example, "n" may range from 4 to 12. In the above formulas, "x" may be at least any of the following values: 4, 5, 6, 8, 10 and/or at most any of the following values: 6, 8, 10, 12, 13, 14; for example, "x" may range from 5 to 13. In the above formulas, "y" may have a value selected from any of 0, 1, 2, and 3; or any combination thereof (e.g., "y" may be selected from any of 1 and 3).

$R^1$, $R^2$, and $R^3$ may each independently represent any of H, —$CH_3$, —$CH_2CH_3$,

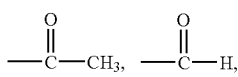

and any of the groups represented by $R^4$ and $R^8$. Any of only one, at least one, only two, at most two, at least two, only three, and at most three of $R^1$, $R^2$, and $R^3$ may be H.

A branched $R^4$ group may lack any branches (i.e., pendent groups) having more than two carbons (e.g., ethyl group) or more than one carbon (e.g., methyl group).

The $R^4$ group may be compatible with the matrix medium of expected use. In this sense, the $R^4$ group of the intercalating agent may facilitate the dispersion in the matrix medium of the silicate platelets having sorbed intercalating agent, such that a colloidal dispersion may be formed where the platelets do not settle out of the matrix medium.

Exemplary intercalating agents having the formula I above include fatty acid esters of pentaerythritol (i.e., fatty acid esters of 2,2-bis-hydroxymethyl-1,3-propanediol), for example, pentaerythritol monostearate ("PEMS"), pentaerythritol distearate, pentaerythritol tristearate, pentaerythritol monobehenate, pentaerythritol dibehenate, pentaerythritol tribehenate, pentaerythritol monooleate, pentaerythritol dioleate, pentaerythritol trioleate, pentaerythritol ricinoleate, pentaerythritol monolaurate, pentaerythritol dilaurate, and pentaerythritol trilaurate. Other exemplary intercalating agents having the formula I above are pentaerythityl stearol (i.e., 2-(hydroxymethyl)-2-[(octadecyloxy)methyl]-1,3-propanediol); 2-(hydroxymethyl)-2-[(4-cyclohexanebutyrate) methyl]-1,3-propanediol; and 2-(hydroxymethyl)-2-[(4-phenylbutyrate)methyl]-1,3-propanediol.

Exemplary intercalating agents having the formula II above include 1-hydroxy-2,2-bis(hydroxymethyl)octadecane; 1-hydroxy-2,2-bis(hydroxymethyl)tetradecane; and 1-hydroxy-2,2-bis(hydroxymethyl)dodecane. Exemplary intercalating agents having the formula III above include 2-(hydroxymethyl)-2-[(octadecylamino)methyl]-1,3-propanediol and N-tris(hydroxymethyl)methyl stearamide. Exemplary intercalating agents having the formula IV above include 2-(hydroxymethyl)-2-[(octadecylthio)methyl]-1,3-propanediol. Exemplary intercalating agents having the formula V above include 2-(hydroxymethyl)-2-[(14-hydroxy-3,6,9,12-tetraoxadeacanoyl)methyl]-1,3-propandiol.

Exemplary intercalating agents having the formula VI above include steroyl citric acid, 2-(octadecanoxy)-1,2,3-propanetricarboxylic acid, 2-(4-phenylbutanoxy)-1,2,3-propanetricarboxylic acid, and stearyl citrate.

Suitable methods for the synthesis of compounds having the above formulas are known to those of skill in the art, and may be found, for example, in Advanced Organic Chemistry, $3^{rd}$ Ed., Jerry March, John Wiley & Sons, New York, 1985, which is incorporated herein in its entirety by reference.

The intercalating agent may be a nonionic intercalating agent, that is, an intercalating agent that does not tend to form or exchange ions, for example, in intercalating a layered silicate.

The average interlayer spacing between the silicate layers of the intercalated layered silicate may be at least about any of the following: 20, 30, 40, 50, 60, 70, 80, and 9 Å; and/or may be at most about any of the following: 100, 90, 80, 70, 60, 50, 40, 30, 25 Å. The amount of the at least one intercalating agent sorbed between the silicate layers may be effective to provide any of the forgoing average interlayer spacing between the silicate layers. The measurement of the average interlayer spacing of the intercalated layered silicate may be made at a relative humidity of 60%.

The amount of the at least one intercalating agent sorbed in the intercalated layered silicate per 100 weight parts layered silicate may be at least about and/or at most about any of the following: 5, 10, 20, 30, 50, 70, 90, 110, 150, 200, and 300 weight parts.

Blends of Intercalating Agent

The amount of the at least one intercalating agent sorbed in the intercalated layered silicate (i.e., any of the amounts described above) may comprise any of only one, at least one, only two, at least two, at most two, only three, at most three, and at least three of any of the intercalating agents described above.

The intercalated layered silicate may comprise a first intercalating agent (selected from those described above) sorbed in the intercalated layered silicate per 100 weight parts layered silicate of at least about and/or at most about any of the following: 5, 10, 20, 30, 50, 70, 90, 110, 150, 200, and 300 weight parts. The intercalated layered silicate may comprise a second intercalating agent (selected from those described above and different from the first intercalating agent) sorbed in the intercalated layered silicate per 100 weight parts layered silicate of at least about and/or at most about any of the following: 0, 5, 10, 20, 30, 50, 70, 90, 110, 150, 200, and 300 weight parts. The intercalated layered silicate may comprise a third intercalating agent (selected from those described above and different from the first and second intercalating agents) sorbed in the intercalated layered silicate per 100 weight parts layered silicate of at least about and/or at most about any of the following: 0, 5, 10, 20, 30, 50, 70, 90, 110, 150, 200, and 300 weight parts.

The weight ratio of the first intercalating agent to the total amount of intercalating agents (selected from those described above) in the intercalated layered silicate may be at least about, and/or at most about, any of the following: 1:20, 1:15, 1:10, 1:5, 1:3, 1:2, 1:1, 2:1, 3:1, 5:1, 10:1, 15:1, and 20:1.

The weight ratio of the second intercalating agent to the total amount of intercalating agents (selected from those described above) in the intercalated layered silicate may be at least about, and/or at most about, any of the following: 1:20, 1:15, 1:10, 1:5, 1:3, 1:2, 1:1, 2:1, 3:1, 5:1, 10:1, 15:1, and 20:1.

The weight ratio of the third intercalating agent to the total amount of intercalating agents (selected from those described above) in the intercalated layered silicate may be at least about, and/or at most about, any of the following: 1:20, 1:15, 1:10, 1:5, 1:3, 1:2, 1:1, 2:1, 3:1, 5:1, 10:1, 15:1, and 20:1.

The ratio of the first to second intercalating agents may be at least about, and/or at most about, any of the following weight ratios based on the weight of the intercalating agents: 1:20, 1:15, 1:10, 1:5, 1:3, 1:2, 1:1, 2:1, 3:1, 5:1, 10:1, 15:1, and 20:1. The ratio of the first to third intercalating agents may be at least about, and/or at most about, any of the following weight ratios based on the weight of the intercalating agents: 1:20, 1:15, 1:10, 1:5, 1:3, 1:2, 1:1, 2:1, 3:1, 5:1, 10:1, 15:1, and 20:1.

The first, second, and third intercalating agents may be selected from any of the above described intercalating agents having any of the formulas I through VII where any of one, at most one, at least one, two, at most two, at least two, three, and at most three of $R^1$, $R^2$, and $R^3$ each independently represent any of H, —CH$_3$, —CH$_2$CH$_3$, —C—CH$_3$, and

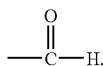

For example, the first, second, and/or third intercalating agents may have any of one, at most one, at least one, two, at most two, at least two, three, and at most three of $R^1$, $R^2$, and $R^3$ as H. By further way of example, the first, second, and/or third intercalating agents may have the structure of formula I wherein any of one, at most one, at least one, two, at most two, at least two, three, and at most three of $R^1$, $R^2$, and $R^3$ is H. For example, the first, second, and/or third intercalating agents may be any of a mono-, di-, or tri-fatty acid ester of pentaerythritol. For example, the first intercalating agent may be a mono-fatty acid ester of pentaerythritol (e.g., PEMS), the second intercalating agent may be a di-fatty acid ester of pentaerythritol (e.g., pentaerythritol di-stearate), and the third intercalating agent may be a tri-fatty acid ester of pentaerythritol (e.g., pentaerythritol tri-stearate).

Another exemplary blend of intercalating agents includes the first intercalating agent being a di-fatty acid ester of pentaerythritol (e.g., pentaerythritol di-stearate) and the second intercalating agent being a tri-fatty acid ester of pentaerythritol (e.g., pentaerythritol tri-stearate) without a third intercalating agent. Still another exemplary blend of intercalating agents includes the first intercalating agent being a di-fatty acid ester of pentaerythritol (e.g., pentaerythritol di-stearate) and the second intercalating agent being a tri-fatty acid ester of pentaerythritol (e.g., pentaerythritol tri-stearate) without a third intercalating agent. Yet another exemplary blend of intercalating agents includes the first intercalating agent being a mono-fatty acid ester of pentaerythritol (e.g., pentaerythritol di-stearate) and the second intercalating agent being a di-fatty acid ester of pentaerythritol (e.g., pentaerythritol tri-stearate) without a third intercalating agent.

Intercalating Agent with Onium Functionality

The intercalated layered silicate may be essentially free of intercalating agent comprising onium functionality. The intercalated silicate may be essentially free of any one, or of all, or of any combination of the following compounds: ammonium compounds, quaternary ammonium compounds, tertiary ammonium compounds, secondary ammonium compounds, primary ammonium compounds, phosphonium compounds, quaternary phosphonium compounds, tertiary phosphonium compounds, secondary phosphonium compounds, primary phosphonium compounds, arsonium compounds, stibonium compounds, oxonium compounds, and sulfonium compounds.

Exemplary ammonium compounds from which the intercalated layered silicate may be essentially free include any one or any combination of the following: alkyl ammonium compounds, such as tetramethyl ammonium compounds, hexyl ammonium compounds, butyl ammonium compounds, bis(2-hydroxyethyl) dimethyl ammonium compounds, bis(2-hydroxyethyl) octadecyl methyl ammonium compounds, octadecyl trimethyl ammonium compounds, octadecyl benzyl dimethyl ammonium compounds, hexyl benzyl dimethyl ammonium compounds, benzyl trimethyl ammonium compounds, butyl benzyl dimethyl ammonium compounds, tetrabutyl ammonium compounds, dodecyl ammonium compounds, di(2-hydroxyethyl) ammonium compounds, and polyalkoxylated ammonium compounds.

Exemplary phosphonium compounds from which the intercalated layered silicate may be essentially free include any one or any combination of the following: alkyl phosphonium compounds, such as tetrabutyl phosphonium compounds, trioctyl octadecyl phosphonium compounds, tetraoctyl phosphonium compounds, octadecyl triphenyl phosphonium compounds.

The intercalated layered silicate may be essentially free of any intercalating agent comprising a compound selected from any or all of the compounds listed in the previous three paragraphs.

Intercalant Fill Agent

The intercalated layered silicate may comprise at least one intercalant fill agent dispersed between the silicate layers of the layered silicate. As used herein, an "intercalant fill agent" does not act substantially as an intercalating agent itself, but rather acts in conjunction with one or more intercalating agents (e.g., the intercalating agents described above) to increase the average interlayer spacing between the silicate layers of the intercalated layered silicate relative to a similarly comparable intercalated layered silicate system without the intercalant fill agent. It is believed that the intercalant fill agent may take up space within the gallery between the silicate layers and hinder the tendency of the long chain moieties of the intercalating agents to lay down (thus promoting the extension of the long carbon chain moieties to support spacing of the gallery).

The intercalant fill agent may be selected from one or more of the compounds described by formulas I-VII above, wherein at least two, and preferably all three, of $R^1$, $R^2$, and $R^3$ represent any of the groups represented by $R^4$ or $R^8$.

For example, the intercalant fill agent may have each of $R^1$, $R^2$, and $R^3$ independently as representing any of an acyl group, an alkyl group, an alkenyl group, and an alkadienyl group. These groups may have, for example, at least any of 8, 10, 12, 14, and 16 carbon atoms; and/or at most any of 30, 28, 26, 24, 22, 20, 18, 16, 14, 12, and 10 carbon atoms. For example, the intercalant fill agent may be a tetra-ester of pentaerythritol, such as a tetra-fatty acid ester of pentaerythritol, for example, pentaerythritol tetra-stearate, 1-octadecoyl-2,2-bis(octadecoylmethyl)octadecane, N-tris(octadecoylmethyl)methyl stearamide, and steroyl hexyl citrate.

Suitable methods for the synthesis of compounds having the above formulas are known to those of skill in the art, and may be found, for example, in Advanced Organic Chemistry, $3^{rd}$ Ed., Jerry March, John Wiley & Sons, New York, 1985, which was previously incorporated by reference.

The intercalated layered silicate may comprise at least one intercalant fill agent selected from a tetra-ester of pentaerythritol and any of only one, at least one, only two, at least two, at most two, only three, and most three of any of the following: mono-ester of pentarythritol, di-ester of pentaerythritol, and tri-ester of pentaerythritol. For example, the intercalated layered silicate may comprise a tetra-ester of pentaerythritol (e.g., pentaerythritol tetra-stearate) and a tri-ester of pentaerythritol (e.g., pentaerythritol tri-stearate). The weight ratio of the tetra-ester of pentaerythritol to the total of the other pentaerythritol esters may be at least about, and/or at most about, any of the following weight ratios: 1:20, 1:15, 1:10, 1:5, 1:3, 1:2, 1:1, 2:1, 3:1, 5:1, 10:1, 15:1, and 20:1

The ratio of the total amount of the at least one intercalant fill agent described above to the total amount of the at least one intercalating agent in the intercalated layered silicate described above may be at least about, and/or at most about, any of the following weight ratios: 1:20, 1:15, 1:10, 1:5, 1:3, 1:2, 1:1, 2:1, 3:1, 5:1, 10:1, 15:1, and 20:1.

The amount of the at least one intercalant fill agent dispersed in the gallery of the intercalated layered silicate per 100 weight parts layered silicate may be at least about and/or at most about any of the following: 5, 10, 20, 30, 50, 70, 90, 110, 150, 200, and 300 weight parts.

The amount of the at least one intercalant fill agents dispersed in the gallery of the intercalated layered silicate (i.e., any of the amounts described above) may comprise any of only one, at least one, only two, at least two, at most two, only three, at most three, and at least three of any of the intercalant fill agents described above.

The intercalated layered silicate may comprise a first intercalant fill agent dispersed in the gallery of the intercalated layered silicate per 100 weight parts layered silicate of at least about and/or at most about any of the following: 5, 10, 20, 30, 50, 70, 90, 110, 150, 200, and 300 weight parts. The intercalated layered silicate may comprise a second intercalant fill agent (different from the first intercalant fill agent) dispersed in the gallery of the intercalated layered silicate per 100 weight parts layered silicate of at least about and/or at most about any of the following: 0, 5, 10, 20, 30, 50, 70, 90, 110, 150, 200, and 300 weight parts. The intercalated layered silicate may comprise a third intercalant fill agent (different from the first and second intercalating agents) dispersed in the gallery of the intercalated layered silicate per 100 weight parts layered silicate of at least about and/or at most about any of the following: 0, 5, 10, 20, 30, 50, 70, 90, 110, 150, 200, and 300 weight parts.

Manufacture of the Intercalated Layered Silicate

To make the intercalated layered silicate, a layered silicate is mixed with the intercalating agent (and optionally the intercalant fill agent) to effect the inclusion (i.e., sorption) of the intercalating agent in the interlayer space between the silicate layers of the layered silicate. In doing so, the resulting intercalated layered silicate may be rendered organophilic (i.e., hydrophobic) and show an enhanced attraction to an organic matrix medium.

In making the intercalated layered silicate, the intercalating agent (and the optional intercalant fill agent) may first be mixed with a carrier, for example, a carrier comprising one or more solvents such as water and/or organic solvents such as ethanol to disperse or solubilize the intercalating agent in the carrier. The intercalating agent/carrier blend may subsequently be mixed with the layered silicate. Alternatively, the layered silicate may be mixed with the carrier to form a slurry, to which the intercalating agent (and the optional intercalant fill agent) may be added. Also, the intercalating agent (and the optional intercalant fill agent) may be mixed directly with the layered silicate without the benefit of a carrier. Further, in a first step the intercalating agent may be mixed with the layered silicate to make an intercalated layered silicate, which in a second step may then be mixed with the intercalant fill agent. Intercalation may be enhanced by addition of one or more of heat, pressure, high shear mixing, ultrasonic cavitation, and microwave radiation to any of the above systems.

The inclusion of the intercalating agent within the interlayer spaces between the silicate layers of the layered silicate increases the interlayer spacing between adjacent silicate layers. This may disrupt the tactoid structure of the layered silicate to enhance the dispersibility of the intercalated layered silicate in the matrix medium, as discussed below.

The intercalating agent sorbed between the silicate layers may be an amount and/or type effective to increase the interlayer spacing between the silicate layers—relative to the spacing before the sorption of the intercalating agent—by at least about any of the following: 5, 6, 7, 8, 10, 12, 14, 15, 18, 20, 30, 40, 50, 60, 70, 80, and 90 Å; and/or by at most about any of the following: 100, 90, 80, 70, 60, 50, 40, 30, 25, 20, 18, 15, 12, 10, 8, and 7 Å.

The intercalating agent sorbed between the silicate layers together with the intercalant fill agent dispersed in the gallery between the silicate layers may be an amount and/or type effective to increase the interlayer spacing between the silicate layers—relative to the spacing before the sorption of the intercalating agent together with the dispersed intercalant fill agent—by at least about any of the following: 5, 6, 7, 8, 10, 12, 14, 15, 18, 20, 30, 40, 50, 60, 70, 80, and 90 Å; and/or by at most about any of the following: 100, 90, 80, 70, 60, 50, 40, 30, 25, 20, 18, 15, 12, 10, 8, and 7 Å.

The intercalated layered silicate may be further treated (or the layered silicate may be treated before intercalation to form the intercalated layered silicate) to aid dispersion and/or exfoliation in a matrix medium and/or improve the strength of a resulting polymer/silicate interface. For example, the intercalated layered silicate (or the layered silicate before intercalation to form the intercalated layered silicate) may be treated with a surfactant or reactive species to enhance compatibility with the matrix medium. With many layered silicates, the silicate layers terminate with surface silanol functionality. It may be desirable for greater compatibility with non-polar matrices to render these surfaces more hydrophobic. One method to achieve this is to modify the surface (e.g., reacte the functional groups present on the edges of the silicate layers) with an organosilane reagent (e.g., silane coupling agent) such as, n-octadecyldimethylchlorosilane, n-octadecyldimethylmethoxysilane, trimethylchlorosilane, hexamethyldisilazane, and the like.

Also by way of example, the intercalated layered silicate may be further intercalated with a compatibilizer, such as a wax, polyolefin oligomer, or polymer having polar groups. Exemplary compatibilizer waxes include polyethylene wax, oxidized polyethylene wax, polyethylene vinyl acetate wax, polyethylene acrylic acid wax, polypropylene wax, montan wax, carnauba wax, candelilla wax, beeswax, and maleated waxes. Examples of maleated wax include maleic anhydride modified olefin oligomer or polymer, and maleic anhydride modified ethylene vinyl acetate oligomer or polymer. An oligomer or polymer may be modified (e.g., grafted) with unsaturated carboxylic acid anhydride (i.e., anhydride-modified oligomer) to incorporate anhydride functionality, which promotes or enhances the adhesion characteristics of the oligomer or polymer (i.e., promotes or enhances the compatibility of the modified oligomer or polymer with the intercalated layered silicate. Examples of unsaturated carboxylic acid anhydrides include maleic anhydride, fumaric anhydride, and unsaturated fused ring carboxylic acid anhydrides. Anhydride-modified polymer may be made by grafting or copolymerization, as is known in the art. Useful anhydride-modified oligomers or polymers may contain anhydride group in an amount (based on the weight of the modified polymer) of at least about any of the following: 0.1%, 0.5%, 1%, and 2%; and/or at most about any of the following: 10%, 7.5%, 5%, and 4%.

Alternatively, the intercalated layered silicate may be substantially free of organosilane reagent (e.g., silane coupling agent), or substantially free of compatibilizers, such as one or more of any of those discussed above.

The intercalated layered silicate may have a peak degradation temperature of at least about any of the following: 360, 380, 390, 395, 400, 405, 410, 420, 430, and 440° C.; and/or at most about any of the following: 380, 390, 395, 400, 405, 410, 420, 430, 440, and 450° C. The intercalated layered silicate may have an onset temperature of degradation of at least about any of the following: 200, 210, 220, 230, 240, 250, and 280° C.; and/or at most about any of the following: 220, 230, 240, 250, 280, and 300° C. The peak degradation temperature and onset temperature of degradation may be determined by thermogravimetric analysis (TGA) of the sample operating at a 20° C. per minute scan rate from room temperature to 800° C. in an argon purged atmosphere, and utilizing first derivative of weight loss analysis. A useful TGA machine for such analysis is the TGA Q50 model available from TA Instruments, Inc.

Dispersed-Particle Composition

The intercalated layered silicate may be exfoliated to form a dispersed-particle composition comprising a plurality of dispersed particles comprising exfoliated silicate platelets dispersed within a matrix medium. The dispersed particles may comprise silicate platelets having sorbed intercalating agent of the type previously discussed.

The matrix medium may comprise one or more polymers, for example, one or more thermoplastic polymers, such as one or more polymers selected from polyolefin, ethylene/vinyl alcohol copolymer, ionomer, vinyl plastic, polyamide, polyester, and polystyrene.

The matrix medium may comprise one or more energy curable polymer precursors, for example, one or more energy curable precursors selected from multifunctional acrylates or methacrylates, thiol-ene systems, epoxy/amine or epoxy polyol systems, and polyurethane precursors such as isocyanates and polyols.

The matrix medium may comprise one or more compounds useful in the formulation of paints, coatings, varnishes, greases, cosmetics, or pharmaceutical excipients (either topical or internal).

Polyolefins

The matrix medium may comprise one or more polyolefins. Exemplary polyolefins include ethylene homo- and co-polymers and propylene homo- and co-polymers. The term "polyolefins" includes copolymers that contain at least 50 mole % monomer units derived from olefin. Ethylene homopolymers include high-density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene, 1-hexene, 1-octene, and mixtures thereof.

Exemplary EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another exemplary ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes: 1) propylene/ethylene copolymers ("EPC"), which are copolymers of propylene and ethylene having a majority weight % content of propylene, such as those having an ethylene comonomer content of less than 15%, less than 6%, and at least about 2% by weight and 2) propylene/butene copolymers having a majority weight % content of propylene.

EVOH

Ethylene/vinyl alcohol copolymer ("EVOH") is another useful thermoplastic. EVOH may have an ethylene content of about 32 mole %, or at least about any of the following values: 20 mole %, 25 mole %, and 30 mole %. EVOH may have an ethylene content of below about any of the following values: 50 mole %, 40 mole %, and 33 mole %. As is know in the art, EVOH may be derived by saponifying or hydrolyzing ethylene/vinyl acetate copolymers, for example, to a degree of hydrolysis of at least about any of the following values: 50%, 85%, and 98%.

Ionomer

Another useful thermoplastic is ionomer, which is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Vinyl Plastics

Useful vinyl plastics include polyvinyl chloride ("PVC"), vinylidene chloride polymer ("PVdC"), and polyvinyl alcohol ("PVOH"). Polyvinyl chloride ("PVC") refers to a vinyl chloride-containing polymer or copolymer—that is, a polymer that includes at least 50 weight percent monomer units derived from vinyl chloride ($CH_2=CHCl$) and also, optionally, one or more comonomer units, for example, derived from vinyl acetate. One or more plasticizers may be compounded with PVC to soften the resin and/or enhance flexibility and processibility. Useful plasticizers for this purpose are known in the art.

Another exemplary vinyl plastic is vinylidene chloride polymer ("PVdC"), which refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1$-$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer ("VDC/MA"), vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15%—and/or at most about any of 25%, 22%, 20%, and 15 weight %—comonomer with the vinylidene chloride monomer.

A layer that includes PVdC may also include a thermal stabilizer (e.g., a hydrogen chloride scavenger such as epoxidized soybean oil) and a lubricating processing aid (e.g., one or more polyacrylates).

Polyamide

Useful polyamides include those of the type that may be formed by the polycondensation of one or more diamines with one or more diacids and/or of the type that may be formed by the polycondensation of one or more amino acids and/or of the type formed by the ring opening of cyclic lactams. Useful polyamides include aliphatic polyamides and aliphatic/aromatic polyamides.

Representative aliphatic diamines for making polyamides include those having the formula:

$$H_2N(CH_2)_nNH_2$$

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

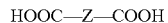

HOOC—Z—COOH where Z is representative of a divalent aliphatic or cyclic radical containing at least 2 carbon atoms. Representative examples include aliphatic dicarboxylic acids, such as adipic acid, sebacic acid, octadecanedioic acid, pimelic acid, suberic acid, azelaic acid, dodecanedioic acid, and glutaric acid; and aromatic dicarboxylic acids, such as such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), polyhexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly (10-aminodecanoic acid) ("nylon-10"), poly(11-aminoundecanoic acid) ("nylon-11"), and poly(12-aminododecanoic acid) ("nylon-12" or "poly(lauryllactam)").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethyleneazelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film, at the desired conditions of use.

Polyesters

Useful polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid component of the polyester may be at least about any the following: 70, 75, 80, 85, 90, and 95%.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

Polystyrene

The matrix medium may comprise polystyrene. Exemplary polysytrene includes styrene homo- and co-polymers. Polystyrene may be substantially atactic, syndiotactic or isotactic. The term "polysytrene" includes copolymer that contains at least 50 mole % monomer units derived from styrene. Styrene may be copolymerized with alkyl acrylates, maleic anhydride, isoprene, or butadiene. Styrene copolymers with isoprene and butadiene may be further hydrogenated.

Energy Curable Polymer Precursors

The matrix medium may comprise one or more energy curable polymer precursors. An energy curable polymer precursor is a compound (e.g., monomer or oligomer) that is intended for transformation to a cured polymer by the application of energy in the form of heat and/or radiation (e.g., light), and may also involve an initiator and/or catalyst. The resulting energy cured polymer may be a thermoset polymer or a thermoplastic polymer. A single energy curable polymer precursor may react to form a polymer, or two or more energy curable polymer precursors may react together to form a polymer. The energy curable polymer precursor may be multifunctional, that is, adapted to form crosslinked polymer when cured. The energy curable chemical reaction may be induced by heat, catalyst interaction, radiation (e.g., light), or mixing of the energy curable polymer precursors, or by a combination of two or more of any of the foregoing mechanisms (e.g., dual cure mechanisms).

Useful energy curable polymer precursors may include one or more of the energy curable polymer precursors that are precursors to one or more of the following polymers: polyester resins (e.g., alkyd resin), allyl resins (e.g., diallyl phthalate, diallyl isophtahalate, diallyl maleate, and diallyl chlorendate), amino resins (e.g., urea resins, melamine resins, and their copolymers with formaldehyde), epoxy resins, furan resins, phenolic resins (e.g., phenol-aralkyl resins, phenol-formaldehyde resins), polyacrylic ester resins, polyamide resins, polyurethane resins, polyacrylamide resins, polyimide resins, and acrylamide resins.

Exemplary energy curable polymer precursors may include (meth)acrylates (i.e., methacrylates and/or acrylates), multifunctional (meth)acrylates, thiol-ene systems, and maleimides.

Exemplary energy curable polymer precursors, for example, with respect to polyurethane polymer precursors, may include polyols and polyisocyanates (e.g., toluene diisocyanate and diphenyl-methanediisocyanate).

With respect to the polyurethane and epoxy resin precursors, for example, the intercalated layered silicate may be mixed with the polyol precursor component rather than the more reactive component to help minimize premature reaction.

Additional Matrix Medium

The matrix medium may comprise one or more compounds useful in the formulation of one or more of any of the following: coatings (i.e., paints and/or varnishes), inks, greases, cosmetics, and pharmaceutical dosage forms.

The matrix medium may comprise one or more materials selected from coating (i.e., paint and/or varnish) solvents, coating binders, and coating resins. Useful coating solvents, coating binders, and coating resins are known to those of skill in the art; see, for example, those discussed in Paints and Coatings, Ullmann's Encyclopedia of Industrial Chemistry, Volume 24, pages 591-790 (2003 Wiley-VCH), of which pages 591-790 are incorporated herein by reference. Examples include mineral spirits, toluene, and linseed oil.

The matrix medium may comprise one or more materials selected from ink solvents and ink resins (e.g., ink binders and/or ink vehicles). Useful ink solvents and ink resins are known to those of skill in the art; see, for example, those discussed in Leach and Pierce, The Printing Ink Manual ($5^{th}$ edition 1993), which is incorporated herein in its entirety.

The matrix medium may comprise one or more materials selected from grease lubricating oils and grease gelling agents. Useful grease lubricating oils and grease gelling agents are known to those of skill in the art; see, for example, those discussed in Kirk-Othmer Encyclopedia of Chemical Technology, Volume 15, pages 493-98 ($4^{th}$ edition 1995), of which pages 493-98 are incorporated herein by reference.

The matrix medium may comprise one or more materials useful in the formulation of cosmetics, for example, one or more materials selected from lipids, emollients, humectants, film formers, binders, surfactants, and solvents. Useful cosmetic lipids, emollients, humectants, film formers, binders, surfactants, and solvents are known to those of skill in the art; see, for example, those discussed in Kirk-Othmer Encyclopedia of Chemical Technology, Volume 7, pages 572-619 ($4^{th}$ edition 1993), of which pages 572-619 are incorporated herein by reference, and CTFA International Cosmetic Ingredient Handbook, $2^{nd}$ edition (CTFA Washington D.C. 1992), which is incorporated herein in its entirety by reference.

Compounds useful in the formulation of pharmaceutical dosage forms include pharmaceutical (e.g., medical) excipients (e.g., carriers). The matrix medium may comprise one or more pharmaceutical excipients, for example, one or more excipients adapted for an internal pharmaceutical dosage form and/or adapted for an external pharmaceutical dosage form. Useful pharmaceutical excipients are known to those of skill in the art; see, for example, those discussed in Pharmaceutical Dosage Forms, Ullmann's Encyclopedia of Industrial Chemistry, Volume 25, pages 515-547 (2003 Wiley-VCH), of which pages 515-547 are incorporated herein by reference.

The matrix medium may comprise one or more of water, an oil-in-water emulsion, and a water-in-oil emulsion.

Dispersed Particles

The dispersed particles in the dispersed-particle composition may have an average size of less than about 100 nm in at least one dimension. The particles may have an average aspect ratio (i.e., the ratio of the average largest dimension to the average smallest dimension of the particles) of from about 10 to about 30,000. Typically, the aspect ratio for particles comprising silicate platelets exfoliated from an intercalated layered silicate may be taken as the length (largest dimension) to the thickness (smallest dimension) of the platelets. For a particle having a fiber configuration, the aspect ratio may be taken as the length (largest dimension) to the diameter (smallest dimension) of the particle.

Useful aspect ratios for the dispersed particles include at least about any of the following values: 10; 20; 25; 200; 250; 1,000; 2,000; 3,000; and 5,000; and at most about any of the following values: 25,000; 20,000; 15,000; 10,000; 5,000; 3,000; 2,000; 1,000; 250; 200; 25; and 20.

The dispersed particles may have an average size in the shortest dimension of at least about any of the following values: 0.5 nm, 0.8 nm, 1 nm, 2 nm, 3 nm, 4 nm, and 5 nm; and at most about any of the following values: 100 nm, 60 nm, 30 nm, 20 nm, 10 nm, 8 nm, 5 nm, and 3 nm, as estimated from transmission electron microscope ("TEM") images. The particles may have an average dimension small enough to maintain optical transparency of the matrix medium in which the particles are dispersed.

The amount of exfoliated particles dispersed in the dispersed-particle composition may be at least about any of the following values 0.1, 0.5, 1, 1.5, 2, 2.5, 3, 4, 5, and 10 weight %; and/or may be at most about any of the following values: 50, 40, 30, 20, 15, 10, 8, 6, 5, 4, 3, 2, and 1 weight %, based on the weight of the dispersed-particle composition. Also, the amount of exfoliated particles dispersed in the dispersed-particle composition may be at least about any of the following values: 0.1, 0.5, 1, 1.5, 2, 2.5, 3, 4, 5, and 10 weight parts; and/or may be at most about any of the following values: 100, 80, 60, 50, 40, 30, 20, 15, 10, 8, 6, 5, 4, 3, 2, and 1 weight parts, based on 100 weight parts of matrix medium, for example, based on 100 weight parts of the one or more polymers discussed above.

The dispersed-particle composition may comprise at least about any of the following: 50, 60, 70, 80, 90, 95, and 98 weight %; and at most about any of the following: 99, 98, 95, 90, 80, 70, and 60 weight %, based on the weight of the dispersed-particle composition of any of the following: 1) the matrix medium, or 2) the one or more polymers, or 3) the energy curable polymer precursors, or 4) the coating solvents, coating binders, or coating resins, or 5) the ink solvents or ink resins, or 6) the grease lubricating oils or grease gelling agents, or 7) the cosmetic lipids, cosmetic emollients, cosmetic humectants, cosmetic film formers, cosmetic binders, cosmetic surfactants, or cosmetic solvents, or 8) pharmaceutical excipients.

The particles may comprise silicate platelets derived from the intercalated layered silicate and an intercalating agent sorbed to the silicate platelets. Exemplary intercalating agents are discussed above. The dispersed-particle composition may be essentially free of intercalating agent comprising onium functionality, such as any one, or of all, or of any combination of the onium compounds discussed above.

The amount of intercalating agent sorbed to the silicate platelets may be at least about and/or at most about any of the following: 1, 5, 10, 20, 30, 50, 70, 90, 110, 150, 200, and 300 weight parts per 100 weight parts silicate platelets.

It is believed that exfoliated particles result when individual silicate layers of a layered silicate are no longer close enough to interact significantly with the adjacent layers via ionic, electrostatic, or van der Waals attractions or to form strongly correlated systems due to the large aspect ratios of the platelets. An exfoliated layered silicate has lost its registry and may be relatively uniformly and randomly dispersed in a continuous matrix medium. It is believed that the dispersion in a matrix medium occurs when the interlayer spacing of the layered silicate is at or greater than the average radius of gyration of the molecules comprising the matrix medium.

A dispersing aid may be used to enhance exfoliation of the intercalated layered silicate into the matrix medium. Exemplary dispersing aids may include one or more of water, alcohols, ketones, aldehydes, chlorinated solvents, hydrocarbon solvents, and aromatic solvents.

Manufacture of the Dispersed-Particle Composition

The intercalated layered silicate may be exfoliated (e.g., partially or completely) in a matrix medium to form the dispersed-particle composition. The intercalated layered silicate may be added to the matrix medium under conditions effective to exfoliate at least a portion of the intercalated layered silicate into particles comprising silicate platelets dispersed in the matrix medium. An amount of intercalated layered silicate mixed with the matrix medium may be at least about any of the following: 0.1, 0.5, 1, 1.5, 2, 2.5, 3, 4, 5, and 10 weight parts intercalated layered silicate; and/or may be at most about any of the following values: 100, 80, 60, 50, 40, 30, 20, 15, 10, 8, 6, 5, 4, 3, 2, and 1 weight parts intercalated layered silicate, based on 100 weight parts of matrix medium, for example, based on 100 weight parts of the one or more polymers discussed above.

At least about any of the following amounts of the intercalated layered silicate added to the matrix medium may be dispersed as exfoliated particles having an average size of less than about 100 nm in at least one dimension: 50, 60, 70, 80, 90, 95, 98, and 99 weight parts exfoliated particles per 100 weight parts added intercalated layered silicate. The exfoliated silicate platelets may have the average thickness of the individual layers of the layered silicate, or may have as an average thickness multiples of less than about any of 10, 5, and 3 layers of the layered silicate. TEM images may be used to estimate the amount and size and characteristics of the exfoliated particles.

The effective exfoliation conditions may include the addition of mixing and/or shearing energy to the mixture of the intercalated layered silicate and the matrix medium. The process variables for exfoliating the intercalated layered silicate in the matrix medium include time, temperature, geometry of the mixing apparatus, and the shear rate, and generally requires a balance of these variables, as is known to those of skill in the art. The balancing of these variables may take into account the desire to minimize the physical degradation or decomposition of the matrix medium and/or the intercalating agent, for example, by limiting the upper temperature of the processing and/or the amount of time at a selected temperature during processing.

An increase in temperature generally provides more thermal energy to enhance exfoliation. A decrease in temperature may lower the viscosity of the mixture while increasing the shear rate. An increase in shear rate generally enhances exfoliation. Shear rates of at least about any of the following may be applied to the mixture of the intercalated layered silicate and the matrix medium: $1 \sec^{-1}$, $10 \sec^{-1}$, $50 \sec^{-1}$, $100 \sec^{-1}$, and $300 \sec^{-1}$.

Illustrative methods or systems for applying shear to effect exfoliation of the intercalated layered silicate in the matrix medium include mechanical systems, thermal shock, pressure alternation, and ultrasonics. A flowable mixture may be sheared by mechanical methods, such as the use of stirrers, blenders, Banbury type mixers, Brabender type mixers, long continuous mixers, injection molding machines, and extruders. Twin screw extruders may be useful, for example, for mixing the intercalated layered silicate with a thermoplastic matrix medium. A thermal shock method achieves shearing by alternatively raising and lowering the temperature of the mixture to cause thermal expansions and contractions to induce internal stresses that cause shear. Sudden and alternating pressure changes may also be used to apply shear to the mixture. Ultrasonic methods induce shear by cavitation or resonant vibrations, which cause varying portions of the mixture to vibrate and become excited at different phases.

The effective exfoliation conditions may comprise raising the temperature of the matrix medium, for example a matrix medium comprising one or more thermoplastic polymers, so that the matrix medium is thermally processible at a reasonable rate in the mechanical system either before, while, or after adding the intercalated layered silicate to the matrix medium. During processing, the mixture of the intercalated layered silicate and the matrix medium may be at a temperature, for example, of at least about and/or at most about any of the following temperatures: 100° C., 150° C., 200° C., 240° C., 280° C., 300° C., 320° C., 350° C., 380° C., and 400° C. The amount of residence time that the mixture of the intercalated layered silicate and the matrix medium may reside at any of these temperatures may be at least about and/or at most about any of the following times: 2, 4, 5, 8, 10, 12, 15, and 20 minutes.

Before effecting exfoliation, the layered silicate may be reduced in size by methods known in the art, including, but not limited to, grinding, pulverizing, hammer milling, jet milling, ball milling, sieving, and their combinations, so that the average particle diameter of the layered silicate may be, for example, less than about any of 100, 50, and 20 microns.

Use of the Intercalated Layered Silicate and Dispersed-Particle Composition

The dispersed particles may be used to enhance the physical and/or performance properties of the matrix medium in which they are dispersed. For example, the dispersed particles may improve one or more of the modulus, strength, impact toughness, permeability, rheological, and surface adhesion properties of the matrix medium incorporating the particles relative to the matrix medium without the particles.

Several types of products may benefit from incorporation of the dispersed-particle composition to improve, for example, performance properties. Exemplary products that may comprise the dispersed-particle composition include:

sheets and panels, which, for example, may be further shaped by pressing, molding, and/or thermoforming to form useful objects;

coatings (i.e., paints and/or varnishes);

lubricants, for example, food-grade lubricants;

greases;

personal care products, such as cosmetics (e.g., antiperspirants, deodorants, facial makeup, decorative makeup, toothpastes, shampoos, soaps, skin conditioners, skin moisturizers, and sunscreens);

pharmaceuticals, such as topical medicinal compositions (e.g., anti-fungal compositions, anti-bacterial compositions, anesthetics, anti-inflammatory compositions, pain-relief ointments, and rash/itch/irritation ointments) and internal medicinal compositions (e.g., pills, tablets, capsules, powders, and solutions); and packaging materials, such as packaging films (e.g., shrink films, stretch films, and food packaging films), bottles, trays, and containers.

A packaging film may comprise one or more layers comprising any of the dispersed-particle compositions discussed above. The film may have any total thickness as long as it provides the desired properties (e.g., free shrink, shrink tension, flexibility, Young's modulus, optics, strength, barrier) for the given application of expected use. The film may have a thickness of less than about any of the following: 20 mils, 10 mils, 5 mils, 4 mils, 3 mils, 2 mils, 1.5 mils, 1.2 mils, and 1 mil. The film may also have a thickness of at least about any of the following: 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, 1.5 mils, 2 mils, 3 mils, and 5 mils.

The film may be monolayer or multilayer. The film may comprise at least any of the following number of layers: 1, 2, 3, 4, 5, 6, 7, 8, and 9. The film may comprise at most any of the following number of layers: 20, 15, 10, 9, 7, 5, 3, 2, and 1. The term "layer" refers to a discrete film component which is coextensive with the film and has a substantially uniform composition. Any of the layers of the film may have a thickness of at least about any of the following: 0.05, 0.1, 0.2, 0.5, 1, 2, and 3 mil. Any of the layers of the film may have a thickness of at most about any of the following: 20, 10, 5, 2, 1, and 0.5 mils. Any of the layers of the film may have a thickness as a percentage of the total thickness of the film of at least about any of the following values: 1, 3, 5, 7, 10, 15, 20, 30, 40, 50, 60, 70, 80, and 90%. Any of the layers of the film may have a thickness as a percentage of the total thickness of the film of at most about any of the following values: 90, 80, 50, 40, 35, 30, 25, 20, 15, 10, and 5%.

A layer of the film may comprise at least about and/or at most about any of the following amounts of dispersed-particle composition based on the layer weight: 0.1, 0.5, 1, 3, 5, 10, 20, 50, 60, 70, 80, 90, 95, 99, and 100 weight %. A layer of the film comprising any of the foregoing amounts of dispersed-particle composition may also have a thickness of at least about, and/or at most about, any of the following percentages based on the total thickness of the film: 90, 80, 70, 60, 50, 40, 30, 20, 15, 10, and 5%.

A layer comprising the dispersed-particle composition may be an outer layer of the film. An outer layer may be an "outside layer" of the film (i.e., an outer layer adapted or designed to face to the outside of a package incorporating the film) or an "inside layer" of the film (i.e., an outer layer adapted or designed to face the inside of a package incorporating the film). If the film comprises only one layer, then the one layer may be considered an "outer layer." A layer comprising the dispersed-particle composition may be an inner or interior layer of the film. An inner or interior layer of the film is between two outer layers of the film.

For example, an internal tie layer of a film, such as disclosed in U.S. patent application Ser. No. 10/452,892 filed Jun. 2, 2003 by Grah et al, which is incorporated herein in its entirety by reference, may comprise the dispersed-particle composition discussed above.

The film comprising the dispersed-particle composition may be formed into a package (e.g., bag or casing) for packaging (e.g., enclosing) an object such as a food product (e.g., coffee, nuts, snack foods, cheese, ground or processed meat products, fresh red meat products, and more specifically, meats such as poultry, pork, beef, sausage, lamb, goat, horse, and fish).

The package may be formed by sealing the film to itself, or by sealing the film to a support member (e.g., a tray, cup, or tub), which supports the product (e.g., a food product) that may be disposed on or in the support member. Seals may be made by adhesive or heat sealing, such as bar, impulse, radio frequency ("RF") or dielectric sealing. Suitable package configurations include end-seal bag, side-seal bag, L-seal bag, pouch, and seamed casing (e.g., back-seamed tubes by forming an overlap or fin-type seal). Such configurations are known to those of skill in the art. The support member (e.g., tray) may also comprise any of the dispersed-particle compositions discussed above. The support member may also comprise a thermoformed web comprising a thermoplastic.

The package may also be formed by laminating or sealing the film comprising the dispersed-particle composition to another substrate. Suitable substrates may comprise: 1) a film comprising one or more of the following materials: polyester (e.g., PET), metalized polyester (e.g., metalized PET), PVdC-coated PET, polypropylene (e.g., biaxially oriented polypropylene or BOPP), metalized BOPP, PVdC, and coated BOPP, 2) paper, 3) paperboard, and 4) metal foil. A composite packaging structure may also be formed by extrusion coating of one or more polymer layers, any or all of which may comprise the dispersed-particle composition, to any of the above substrates.

Also by way of example, once a film comprising the dispersed-particle composition has been placed in a tube or casing configuration, one end of the tube may be closed by tying, clipping (e.g., metal clips), or sealing. The tube may then be filled through the remaining open end with an uncooked food product (e.g., a sausage emulsion or another flowable meat product). The remaining open end may then be closed by tying, clipping, or sealing to form a package enclosing a food product. This filling procedure may take place, for example, by vertical form-fill-seal or horizontal form-fill-seal processes known to those of skill in the art.

The packaged food product enclosed within the package comprising the film comprising the dispersed-particle composition may be processed (e.g., cooked, retorted, or pasteurized) for example, by immersing the packaged food in a liquid hot water bath, exposing the packaged food to steam, or exposing the packaged food to hot air, for an effective amount of time and at an effective temperature and pressure. This exposure may also shrink the package tightly about the enclosed food product by heat shrinking the film. The packaged food may also be exposed to an amount of radiation such as microwave radiation effective to cook the packaged food. After the food product has been processed (e.g.; cooked or retorted) to a desired level, the packaged food may be sold in the packaged form, or the package may be stripped from the cooked food so the food may be processed further or consumed.

A film comprising the dispersed-particle composition may be manufactured by thermoplastic film-forming processes known in the air. The film may be prepared by extrusion or coextrusion utilizing, for example, a tubular trapped bubble film process or a flat film (i.e., cast film or slit die) process. The film may also be prepared by extrusion coating. Alternatively, the film may be prepared by adhesively or extrusion laminating the various layers. These processes are known to those of skill in the art. A combination of these processes may also be employed.

A film comprising the dispersed-particle composition may be non-oriented. Alternatively, a film comprising the dispersed-particle composition may be oriented in either the machine (i.e., longitudinal), the transverse direction, or in both directions (i.e., biaxially oriented), in order to reduce the permeability and/or to enhance the strength, optics, and durability of the film. The orientation of the film may also enhance the orientation of the silicate platelets of the dispersed-particle composition, so that generally the major plane through the platelets is substantially parallel to the major plane through the film. The film may be oriented in at least one direction by at least about any of the following ratios: 2.5:1, 3:1, 3.5:1, and 3.7:1; and/or by at most about 10:1.

A film comprising the dispersed-particle composition may be non-heat shrinkable—for example, having a free shrink in any direction at 185° F. (85° C.) of less than about any of the following: 4%, 3%, 1%, and 0.5%. A film comprising the dispersed-particle composition may be heat shrinkable (i.e., has a shrink characteristic), which as used herein, means that the film has a free shrink at 185° F. (85° C.) in at least one direction of at least about 5% at 185° F. For example, the film comprising the dispersed-particle composition may have a free shrink at 185° F. (85° C.) in either of the machine or transverse directions (or both directions) of at least about, and/or at most about, any of the following: 7%, 10%, 15%, 25%, 30%, 40%, 45%, 50%, 55%, 60%, 70%, and 80%. Further, the film may have any of the preceding free shrink values measured at a temperature selected from any of 200° F., 220° F., 240° F., 260° F., and 280° F.

The film may have unequal free shrink in both directions (i.e., differing free shrink in the machine and transverse directions). For example, the film may have a free shrink (185° F.) in the machine direction of at least 40% and a free shrink (185° F.) in the transverse direction of at least 25%. The film may not have a heat shrink characteristic in both directions. For example, the film may have a free shrink at 185° F. in one direction of less than about any of the following: 5%, 4%, 3%, 2% and 1%; or the film may have 0% free shrink at 185° F. in one direction. The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

As is known in the art, a heat-shrinkable film shrinks upon the application of heat while the film is in an unrestrained state. If the film is restrained from shrinking to some extent—for example by a packaged product around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

A film comprising the dispersed-particle composition may exhibit a shrink tension at 185° F. in at least one direction of at least about, and/or at most about, any of the following: 100 psi, 150 psi, 175 psi, 200 psi, 225 psi, 250 psi, 275 psi, 300 psi, 325 psi, 350 psi, 400 psi, 450 psi, 500 psi, 550 psi, and 600 psi. Further, the film may have any of the preceding shrink tensions measured at a temperature selected from any of 200° F., 220° F., 240° F., 260° F., and 280° F. The film may have unequal shrink tension in both directions (i.e., differing shrink tension in the machine and transverse directions). The film may not have a shrink tension in one or both directions. Shrink tension is measured at a specified temperature (e.g., 185° F.) in accordance with ASTM D 2838 (Procedure A), which is incorporated herein in its entirety by reference. All references to shrink tension in this application are by this standard.

A film comprising the dispersed-particle composition may be annealed or heat-set to reduce the free shrink slightly, substantially, or completely; or the film may not be heat set or annealed once the oriented film has been quenched in order that the film will have a high level of heat shrinkability.

Appearance Characteristics

A film comprising the dispersed-particle composition may have low haze characteristics. Haze is a measurement of the transmitted light scattered more than 2.5° from the axis of the incident light. Haze is measured against the outside layer of the film. As previously discussed, the "outside layer" is the outer layer of the film that will be adjacent the area outside of the package comprising the film. Haze is measured according to the method of ASTM D 1003, which is incorporated herein in its entirety by reference. All references to "haze" values in this application are by this standard. The haze of the film may be no more than about any of the following values: 30%, 25%, 20%, 15%, 10%, 8%, 5%, and 3%.

A film comprising the dispersed-particle composition may have a gloss, as measured against the outside layer of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (60° angle), which is incorporated herein in its entirety by reference.

A film comprising the dispersed-particle composition may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The transparency (i.e., clarity) of the film may be at least about any of the following values: 65%, 70%, 75%, 80%, 85%, and 90%, as measured in accordance with ASTM D1746.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

The following examples are presented for the purpose of further illustrating and explaining the present invention and are not to be taken as limiting in any regard. Unless otherwise indicated, all parts and percentages are by weight.

Example 1

10.0 grams of montmorillonite (Cloisite Na+, Southern Clay Products) was mixed with 10 grams of water in a standard Coors mortar to form a clay/water slurry at room temperature. 4.21 grams of a blend of pentaerythritol stearates from Oleon Corporation under the Radiasurf 7174 trademark was heated to 100° C. using a double boiler and then added to the slurry. The blend of pentaerythritol stearates (i.e., the Radiasurf 7174 blend) is believed to comprise 8.4 mole % pentaerythritol monostearate, 33.0 mole % pentaerythritol di-stearate, 43.5 mole % pentaerythritol tri-stearate, and 15.2 mole % pentaerythritol tetra-stearate.

The resulting mixture was hand compounded in the mortar for 10 minutes at room temperature to form an intercalated layered silicate, namely, a pentaerythritol stearate intercalated montmorillonite clay. The intercalated layered silicate was dried in an 80° C. oven overnight, ground, and sieved through a 325 mesh screen to a fine powder.

The average interlayer spacing (i.e., the basal d-spacing) of the resulting intercalated layered silicate (i.e., PES intercalated clay) was determined using a BEDE D1 X-ray diffractometer. A representative sample of the pentaerythritol stearate intercalated clay was set upon a fitted glass slide for scanning by the diffractometer, which was operated in the powder diffraction mode using a copper X-ray source (X-ray wave-length 0.154 nm) and a sweep of 0.5 to 20 2Theta-Omega. The interlayer spacing was calculated using Bragg's Law, $n\lambda = 2 \cdot d \sin \theta$, where "n"=the order of the diffraction peak, "$\lambda$"=the wavelength, "d"=the interlayer spacing (i.e., the basal d-spacing), and "$\theta$"=the scattering angle. The diffraction pattern for the pentaerythritol stearate intercalated clay is shown in FIG. 1. The pattern indicated a diffraction peak or shoulder at a 2θ of from 1.22° to 1.30°, which calculates to an average interlayer spacing of the layered silicate (i.e., the primary basal d-spacing) of from 68 to 72 Å.

Figure 2:
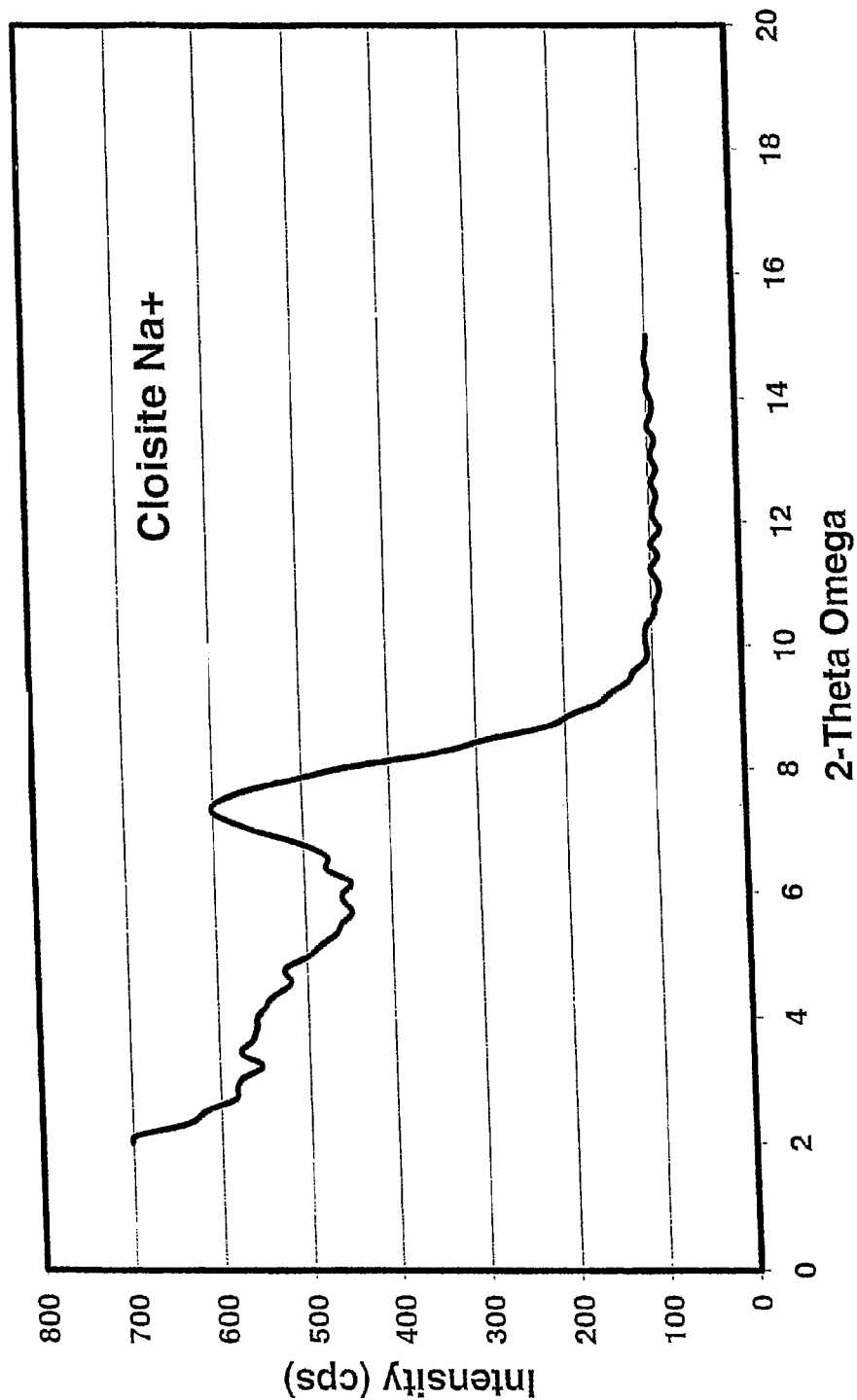
FIG. 2 is an X-ray diffraction pattern for non-intercalated montmorillonite clay.

FIG. 2 shows the diffraction pattern for the non-intercalated montmorillonite clay. The pattern indicated a diffraction peak at a 2θ of 7.42°, which calculates to an average interlayer spacing (i.e., the primary basal d-spacing) for the montmorillonite clay before intercalation of 11.9 Å, measured and calculated as set forth above. Accordingly, the inclusion of the pentaerytritol stearate intercalating agent and intercalant fill agent between the silicate layers of the montmorillonite increased the average interlayer spacing of the silicate layers by from about 56.1 to about 60.1 Å.

Figure 8:
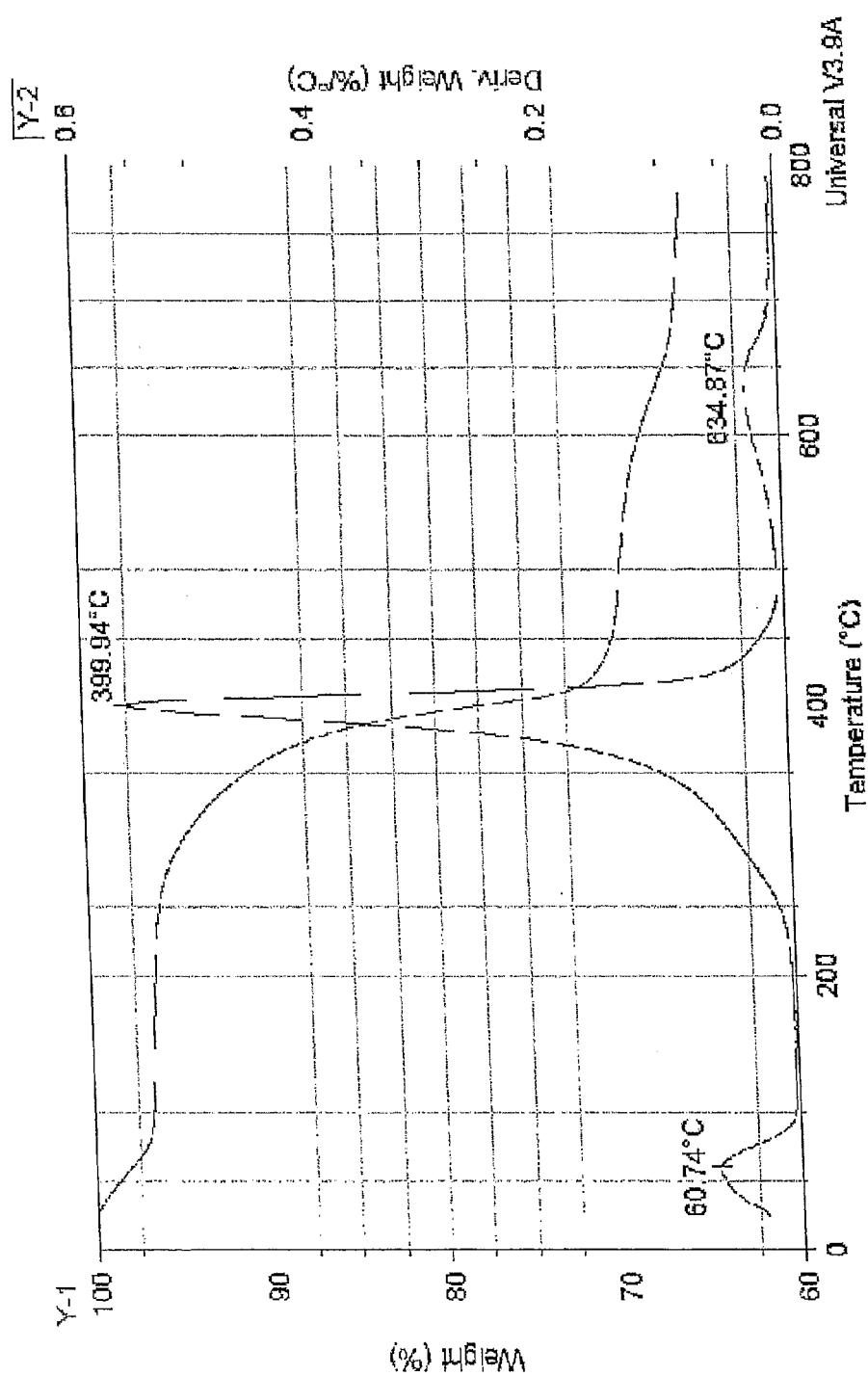
FIG. 8 is a thermogravimetric analysis (TGA) graph for the Example 1 blend of pentaerythritol stearates intercalated montmorillonite clay.
Figure 9:
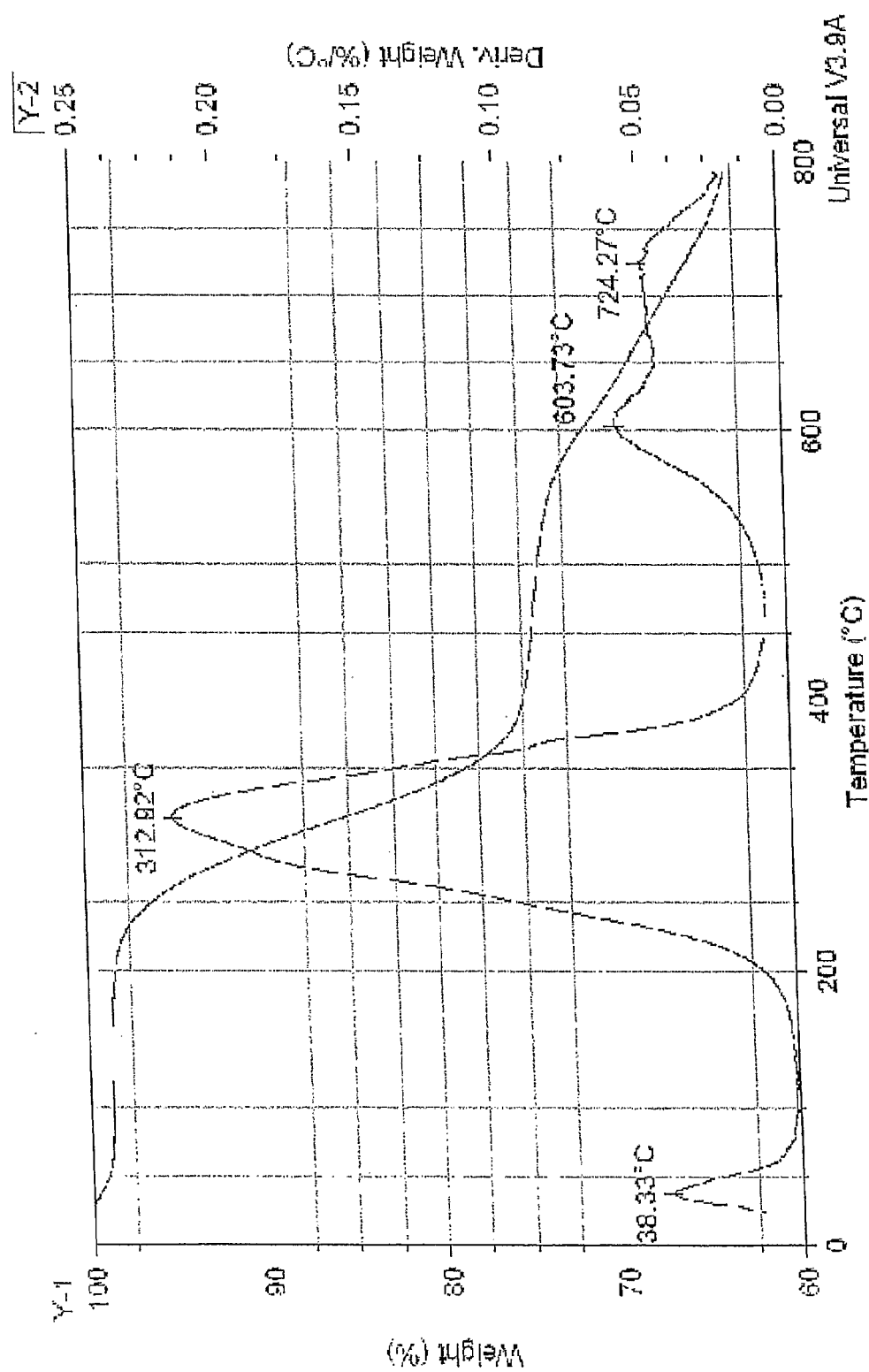
FIG. 9 is a thermogravimetric analysis (TGA) graph obtained for the Comparative Sample 1 Cloisite 20A intercalated clay.

Thermogravimetric analysis (TGA) was obtained for the Example 1 pentaerythritol stearate intercalated montmorillonite clay and the Cloisite 20A intercalated clay describe below as Comparative Sample 1. The TGA equipment used was a TGA Q50 model available from TA Instruments, Inc. operating at a 20° C. per minute scan rate from room temperature to 800° C. in an argon purged atmosphere. FIG. 8 shows the TGA results for the primary and first derivative of weight loss for the Example 1 pentaerythritol stearate intercalated montmorillonite. FIG. 9 shows the TGA results for the primary and first derivative weight loss for the Comparative Sample 1. The peak degradation temperature of the Example 1 pentaerythritol stearate intercalated montmorillonite was 399.94° C., which is about 87° C. higher than the 312.92° C. peak degradation temperature of the Comparison Sample 1 intercalated montmorillonite. Further, the onset temperature of degradation for the Example 1 pentaerythritol stearate intercalated montmorillonite was approximately 50° C. higher than for the Comparison Sample 1.

Example 2

250 grams of montmorillonite (Cloisite Na+, Southern Clay Products) was mixed with 100 grams of water in a Hobart mixing bowl at room temperature to form a clay/water slurry. 105.25 grams of the blend of pentaerythritol stearates of Example 1 was heated to 40° C. and then added to the slurry. The resulting mixture was compounded using a Hobart auger extruder at room temperature for 30 minutes and with a rotor rotation speed of 200 rpm to form an intercalated layered silicate, namely, a pentaerythritol stearate intercalated montmorillonite clay. The intercalated clay was dried in an 80° C. oven overnight, ground, and sieved through a 325 mesh screen to yield a fine powder of the pentaerythritol stearate intercalated montmorillonite. The average interlayer spacing of the intercalated clay was determined as described above with respect to Example 1. The primary d-spacing (i.e., average interlayer spacing) of the resulting intercalated layered silicate was 53.4 Å. The results are also shown in Table 1 below.

Comparative Sample 1

Figure 3:
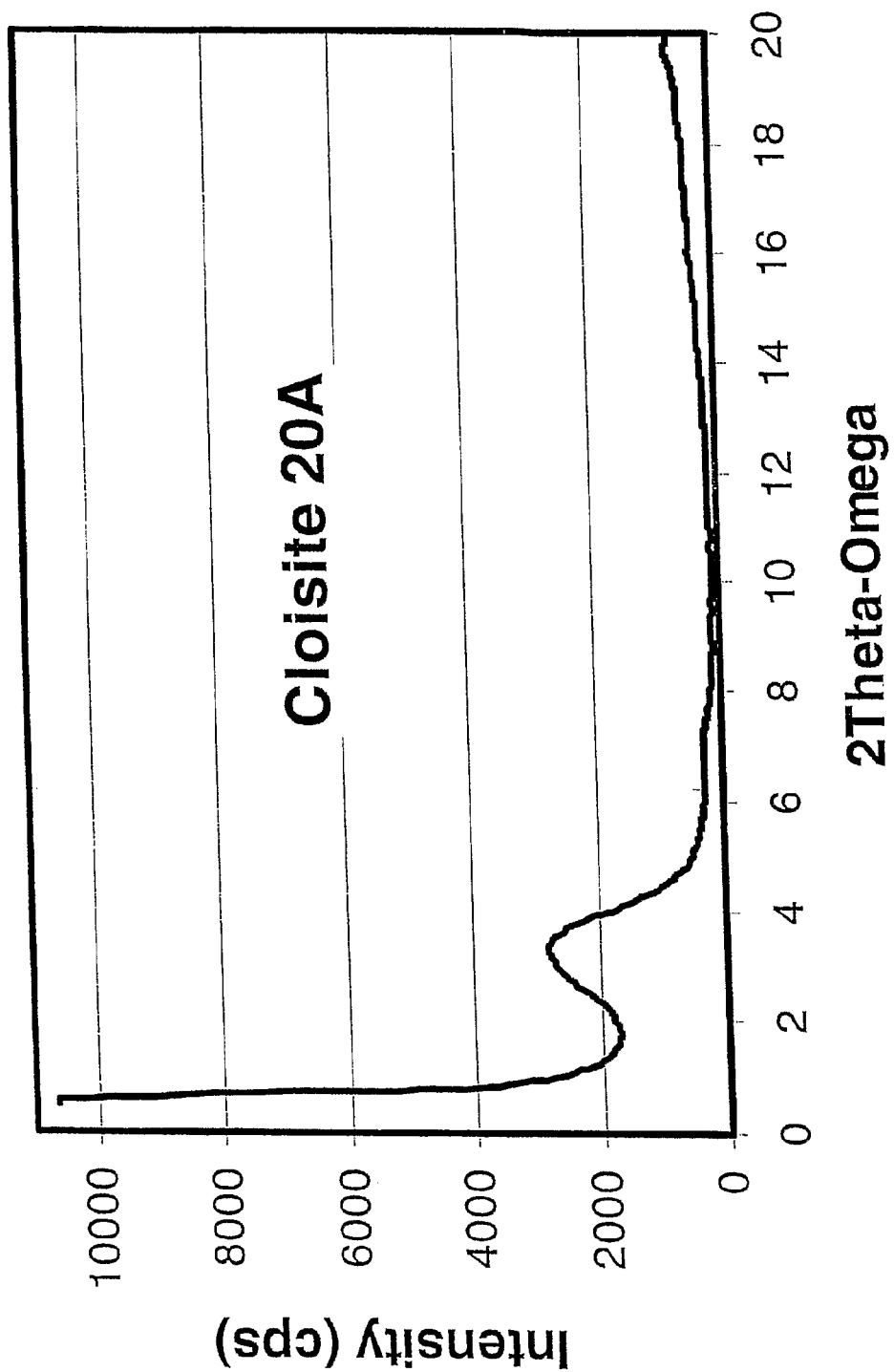
FIG. 3 is an X-ray diffraction pattern for montmorillonite clay intercalated with dimethyl dihydrogenated tallow quaternary ammonium intercalated montmorillonite, as discussed in Comparative 1.

A commercially available dimethyl didehydrogenated tallow quaternary ammonium intercalated montmorillonite (Cloisite 20A) was obtained from Southern Clay Products. The concentration of the intercalating agent was 95 meq/100 g clay (i.e., approximately 30 weight % intercalant). The average interlayer spacing of the intercalated clay was determined as described above with respect to Example 1. The diffraction pattern for Cloisite 20A is shown in FIG. 3. The pattern indicated a diffraction peak at a 2θ of 3.65°, which calculated to an average interlayer spacing of the layered silicate of 24.2 Å.

Example 3

The pentaerythritol stearate intercalated clay of Example 1 was mixed with a matrix medium of linear low density polyethylene (LLDPE) from the Dow Corporation under the Dowlex 2045 trade name. The ratio of the mixture was 5 weight % pentaerythritol stearate intercalated clay to 95 weight % LLDPE matrix medium. The mixture was compounded for 45 minutes at 145° C. using a Haake Rheomix 600 Bowl Mixer operating at 55 rpm mixer speed to form the Example 3 dispersed-particle composition. The resulting dispersed-particle composition was pressed on a Carver press between two glass plates into a transparent film having a thickness varying from 40 to 100 microns.

Figure 4:
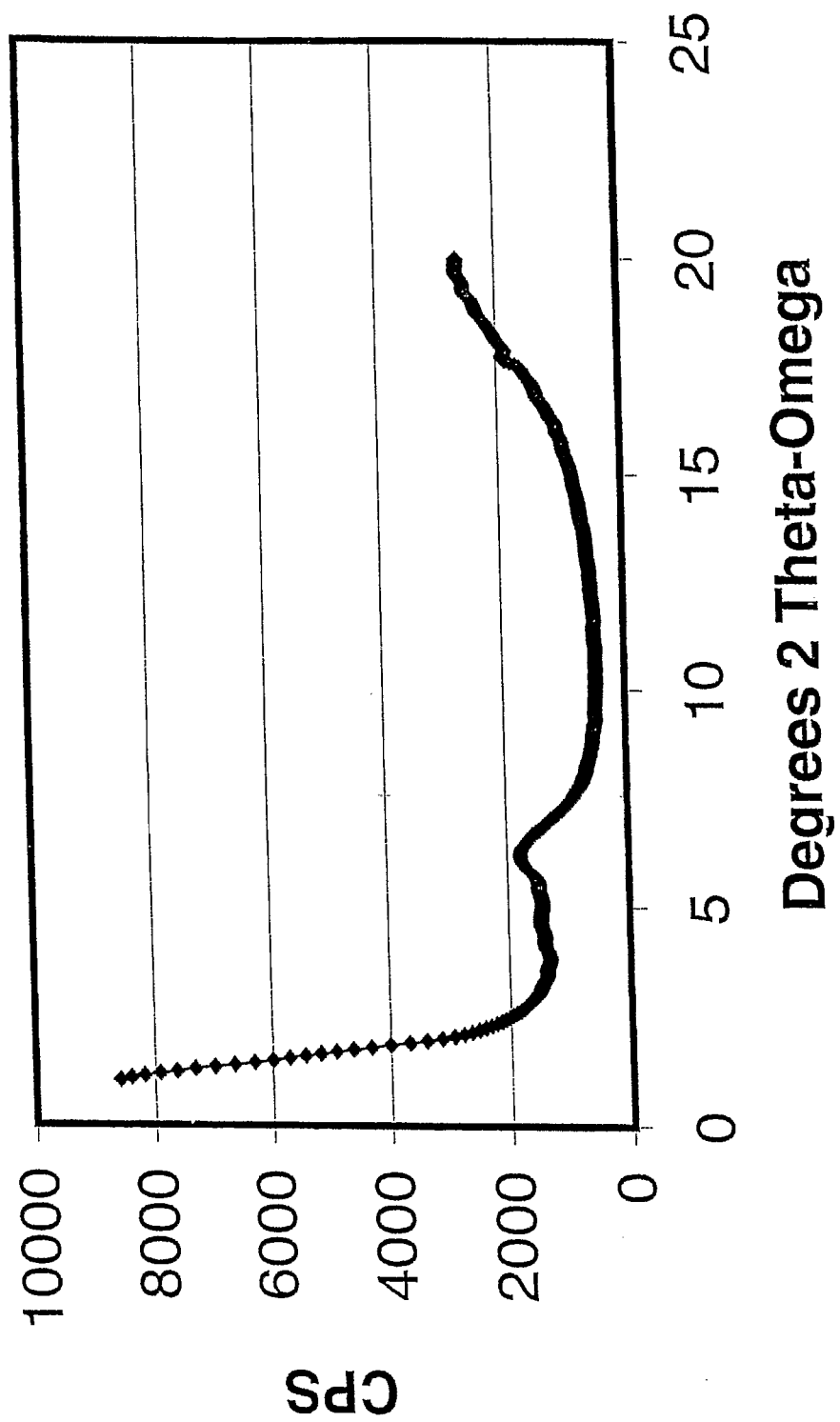
FIG. 4 is an X-ray diffraction pattern for montmorillonite clay intercalated with a blend of pentaerythritol stearates dispersed in a matrix medium of linear low density polyethylene, as discussed in Example 3.

A wide angle X-ray diffraction pattern was obtained for the Example 3 dispersed-particle composition using the method described above with respect to Example 1 and is shown in FIG. 4. The results indicated that the intercalated layered silicate was substantially exfoliated because the peak or shoulder at a 2θ of from 1.22° to 1.30° corresponding to the d-spacing for clay intercalated with PES was absent, and the film was substantially transparent.

Example 4

The pentaerythritol stearate intercalated clay of Example 1 was mixed with a matrix medium of isotactic polypropylene (PP) from ExxonMobil Corporation under the Escorene PP-4292 tradename. The ratio of the mixture was 5 weight % pentaerythritol stearate intercalated clay to 95 weight % polypropylene matrix medium. The mixture was compounded for 45 minutes at 170° C. using a Haake Rheomix 600 Bowl Mixer operating at 50 rpm mixer speed to form the Example 4 dispersed-particle composition. The resulting dispersed-particle composition was pressed on a Carver press between two glass plates into a transparent film having a thickness varying from 40 to 100 microns.

Figure 5:
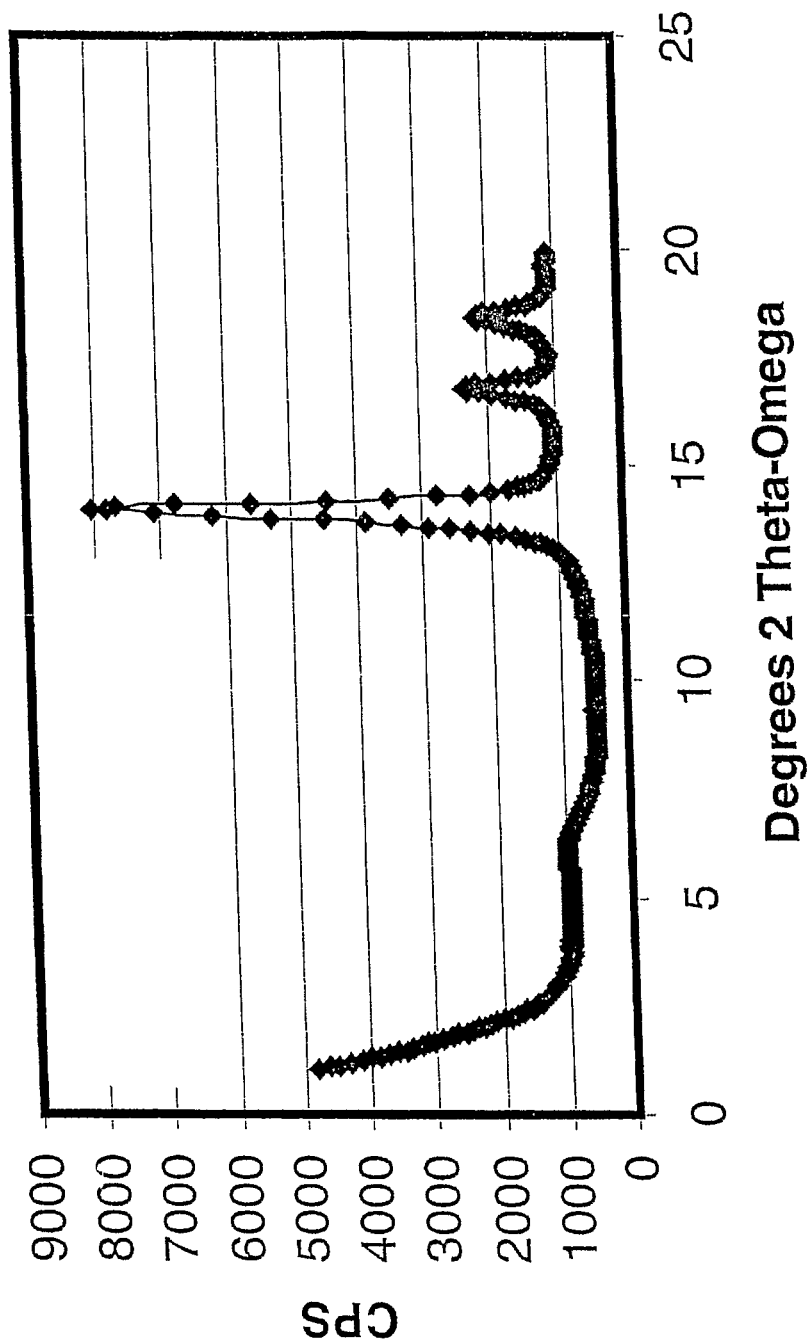
FIG. 5 is all X-ray diffraction pattern for montmorillonite clay intercalated with a blend of pentaerythritol stearates dispersed in a matrix medium of isotactic polypropylene, as discussed in Example 4.

A wide angle X-ray diffraction pattern was obtained for the Example 4 dispersed-particle composition using the method described above with respect to Example 1 and is shown in FIG. 5. The results indicated that the intercalated layered silicate was substantially exfoliated because the peak or shoulder at a 2θ of from 1.22° to 1.30° corresponding to the d-spacing for clay intercalated with PES was absent, and the film was substantially transparent.

Example 5

The pentaerythritol stearate intercalated clay of Example 1 was mixed with a matrix medium of ethylene/vinyl acetate copolymer (EVA) having 28 weight % vinyl acetate content from Exxon Chemical Corporation under the Escorene LD-761 tradename. The ratio of the mixture was 5 weight % pentaerythritol stearate intercalated clay to 95 weight % EVA matrix medium. The mixture was compounded for 45 minutes at 155° C. using a Haake Rheomix 600 Bowl Mixer operating at 60 rpm mixer speed to form the Example 5 dispersed-particle composition. The resulting dispersed-particle composition was pressed on a Carver press between two glass plates into a transparent film having a thickness varying from 40 to 100 microns.

Figure 6:
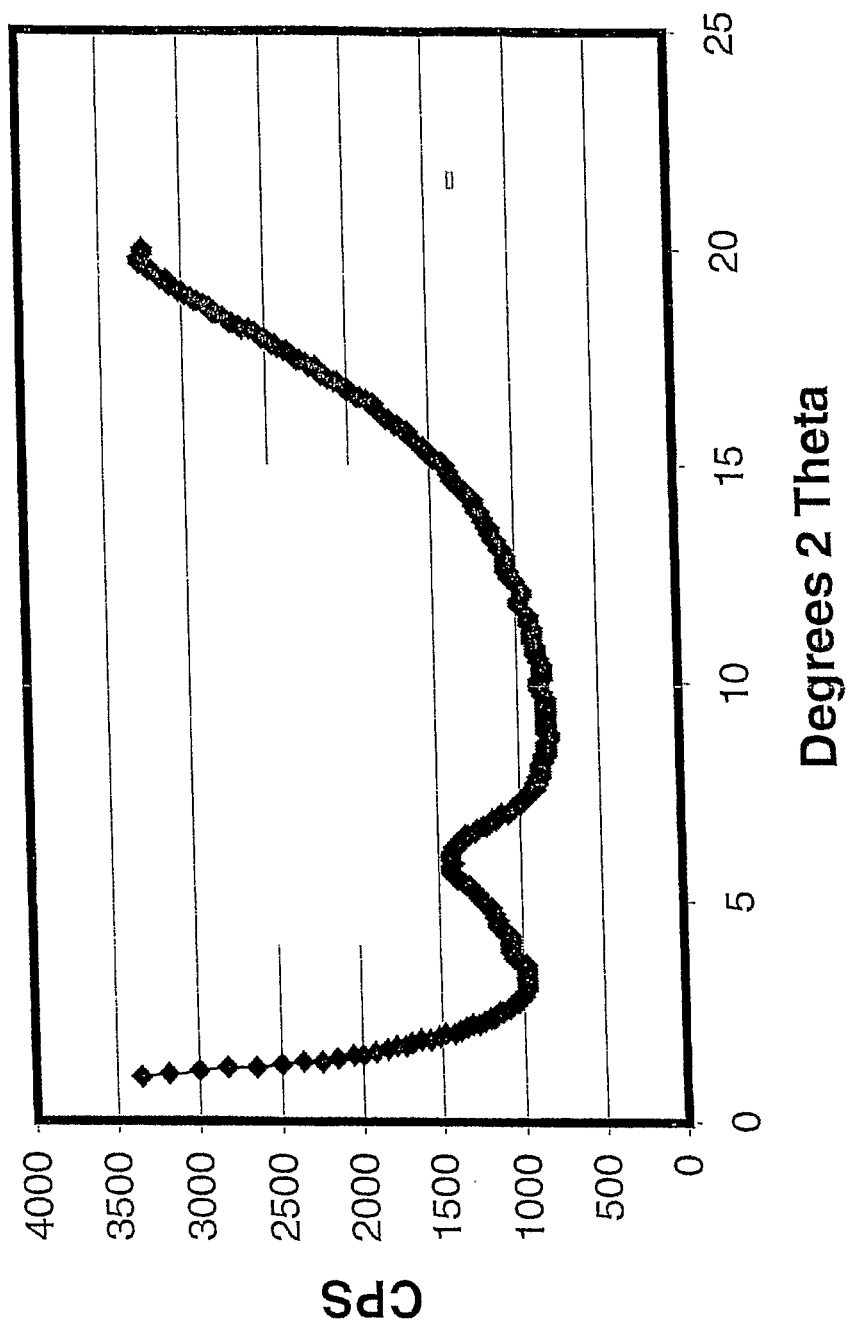
FIG. 6 is an X-ray diffraction pattern for montmorillonite clay intercalated with a blend of pentaerythritol stearates dispersed in a matrix medium of ethylene/vinyl acetate copolymer, as discussed in Example 5.

A wide angle X-ray diffraction pattern was obtained for the Example 5 dispersed-particle composition using the method described above with respect to Example 1 and is shown in FIG. 6. The results indicated that the intercalated layered silicate was substantially exfoliated because the peak or shoulder at a 2θ of from 1.22° to 1.30° corresponding to the d-spacing for clay intercalated with pentaerythritol stearate was absent, and the film was substantially transparent. It is hypothesized that the 2θ peak at about 6° may indicate that some non-intercalated layered silicate might have been present, perhaps because the sheer of the mixing and/or the reactivity of the matrix medium may have displaced or degraded some of the pentaerythritol stearate intercalating agent to allow collapse of some silicate layers together.

Example 6

The pentaerythritol stearate intercalated clay of Example 1 was mixed with a matrix medium of nylon-6 polymer (PA6) from BASF Corporation under the Ultramid B35 tradename. The ratio of the mixture was 5 weight % pentaerythritol stearate intercalated clay to 95 weight % PA6 matrix medium. The mixture was compounded for 45 minutes at 210° C. using a Haake Rheomix 600 Bowl Mixer operating at 50 rpm mixer speed to form the Example 6 dispersed-particle composition. The resulting dispersed-particle composition was pressed on a Carver press between two glass plates into a transparent film having a thickness varying from 40 to 100 microns.

Figure 7:
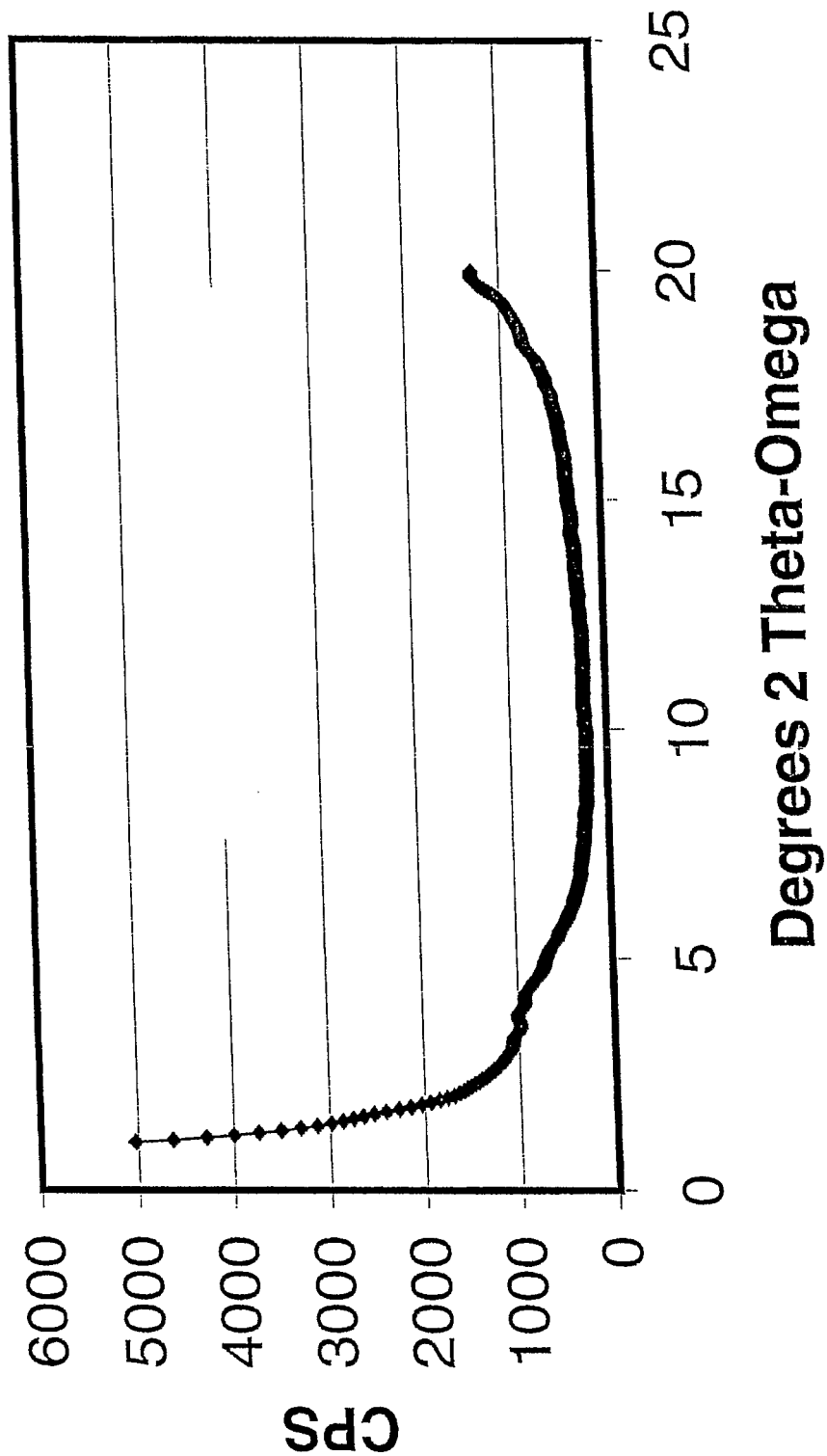
FIG. 7 is an X-ray diffraction pattern for montmorillonite clay intercalated with a blend of pentaerythritol stearates dispersed in a matrix medium of nylon-6 polymer, as discussed in Example 6.

A wide angle X-ray diffraction pattern was obtained for the Example 6 dispersed-particle composition using the method described above with respect to Example 1 and is shown in FIG. 7. The results indicated that the intercalated layered silicate was substantially exfoliated because the peak or shoulder at a 2θ of from 1.22° to 1.30° corresponding to the d-spacing for clay intercalated with pentaerythritol stearate was absent, and the film was substantially transparent.

Examples 7-10

The following Examples 7 through 10 were made according to the procedure set forth above for Example 2, except with different blends of pentaerythritol esters and in the amounts set forth below in Table 1. The blend of pentaerythritol esters used in Example 7 was a blend of pentaerythritol oleates obtained from Oleon Corporation under the Radiasurf 7156 trademark. The blend of pentaerythritol esters used in Example 8 was a blend of pentaerythritol stearates obtained from Oleon Corporation under the Radiasurf 7173 trademark. The blend of pentaerythritol esters used in Example 9 was a blend of pentaerythritol behenates obtained from Oleon Corporation under the Radiasurf 7514 trademark. The blend of pentaerythritol esters used in Example 10 was a blend of pentaerythritol stearates obtained from Oleon Corporation under the Radiasurf 7176 trademark. The relative amounts of the different orders of esters of each pentaerythritol blend were determined by Carbon-13 nuclear magnetic resonance and are reported in Table 1. The average interlayer spacing of the intercalated clay was determined as described above with respect to Example 1. The primary d-spacings corresponding to the silicate spacing of the resulting intercalated clays are reported in Table 1.

TABLE 1

| | Example 2 | Example 7 | Example 8 | Example 9 | Example 10 |
|---|---|---|---|---|---|
| Fatty Acid Ester | Stearate | Oleate | Stearate | Behenate | Stearate |
| mole % mono-ester | 8.4 | 13.1 | 2.5 | 0 | 0 |
| mole % di-ester | 33.0 | 41.4 | 21.5 | 7.5 | 5.0 |
| mole % tri-ester | 43.5 | 37.3 | 47.1 | 42.0 | 36.5 |
| mole % tetra-ester | 15.2 | 8.3 | 28.8 | 50.5 | 58.5 |
| wt. ratio of ester blend to montmorillonite | 0.42:1 | 0.418:1 | 0.42:1 | 0.479:1 | 0.42:1 |
| Primary d-spacing | 53.4 Å | 55.2 Å | 61.3 Å | 55.3 Å | 46.8 Å |

Examples 11-18

Synthesis of ten different blends of pentaerythritol esters was carried out by direct esterification of pentaerythritol. Typical reaction conditions were to stir under nitrogen a 1:1 mole ratio of pentaerythritol and the corresponding carboxylic acid at 190-240° C. for 30 minutes with 0.2% by wt. zinc oxide as a catalyst. Water was removed with a Dean-Stark trap. The cooled product was dissolved in tetrahydrofuran and filtered to remove the catalyst and unreacted pentaerythritol. The yield is reported in Table 2.

TABLE 2

| Ester Blend | Fatty Acid used for esterification | mp (° C.) | Yield (wt. %) |
|---|---|---|---|
| PES1 | Stearic (C18) | 63-67 | 90.0 |
| PEO1 | Octanoic (C8) | Viscous liquid | 74.7 |
| PEND1 | Neodecanoic (~C10) | Viscous liquid | 60.2 |
| PEB1 | Behenic (C22) | 68-73 | 50.4 |
| PEHC1 | Hydrocinnamic | Viscous liquid | 78.6 |
| PECHB1 | Cyclohexanebutyric | Viscous liquid | 90.6 |
| PEPB1 | 4-phenylbutyric | Viscous liquid | 79.9 |
| PE32 | ~C32 fatty acid (Unicid ® 425) | 67-79 | 40.0 |
| PEHPP1 | 3,5-di-t-butyl-4-hydroxyphenylpropionic acid | Viscous liquid | 81.4 |
| PETC1 | Trans-cinnamic | Viscous liquid | 85.0 |

The distribution of the ester orders for each blend was quantified by a combination of proton and carbon NMR spectroscopy. GPC and LC/MS were also used to characterize the ester blends. The distribution of ester orders for each blend is shown in Table 3.

To make each of Examples 11-18 intercalated layered silicates, 40.0 g of purified montmorillonite (Cloisite Na+, Southern Clay Products) was placed in a bowl. With hand agitation, about 20 g of water was added drop wise until the consistency of small pebbles was obtained. Molten selected pentaerythritol ester in an amount identified in Table 3 was slowly added to the clay with mixing. The clay mixture was transferred to a 60 cc Brabender mixing chamber equipped with cam blades heated to 75° C. (higher temperatures were used for higher melting intercalating agents). The mixture was processed for 15 minutes at 100 rpm. The resulting intercalated layered silicates had an organic content of from about 20 to about 40%.

Each of the resulting intercalated layered silicates (Examples 11-18) were dried at 80° C. overnight, ground and sieved through a 325 mesh sieve. The average interlayer spacing (i.e., the basal d-spacing) of the resulting intercalated layered silicate was determined as in Example 1. The results are summarized below in Table 3.

TABLE 3

| Example | Intercalating Agent | Ester Distribution (mole %) | | | | Wt. ratio of ester blend to montmorillonite | Primary d-spacing (Å) |
|---|---|---|---|---|---|---|---|
| | | Mono | Di | Tri | Tetra | | |
| 11 | PES1 | 47.2 | 41.0 | 11.8 | trace | 0.42:1 | 55.37 |
| 12 | PEO1 | 60.2 | 33.8 | 6.1 | trace | 0.27:1 | 58.49 |
| 13 | PEND1* | — | — | — | — | 0.29:1 | 58.26 |
| 14 | PEB1 | 34.4 | 44.9 | 20.8 | trace | 0.47:1 | 52.90 |
| 15 | PEHC1 | 46.2 | 35.6 | 8.7 | 0.2 | 0.28:1 | 57.78 |
| 16 | PECHB1 | 33.9 | 49.1 | 17.1 | trace | 0.30:1 | 56.18 |
| 17 | PEPB1 | 52.8 | 38.1 | 9.0 | trace | 0.29:1 | 56.61 |
| 18 | PE32* | — | — | — | — | 0.74:1 | 56.27 |
| | PEHPP1 | 37.3 | 51.6 | 11.1 | <1 | | |
| | PETC1 | 34.8 | 45.4 | 17.6 | 2.2 | | |

*The ester distributions for PEND1 and PE32 were not reported.

Examples 19-24

Pentaerythritol fatty acid esters are generally obtained as mixtures of mono, di, tri and tetra esters. In addition, the fatty acid portion may be a practical mixture of varying hydrocarbon chain lengths.

The commercially available blend of pentaerythritol stearate esters of Example 1 (Radiasurf™ 7174 from Oleon) was recrystallized from anhydrous ethanol to provide a first fraction (designated O-E-1) and a second fraction (designated O-E-2). The O-E-1 was principally tetra- and tri-esters of pentaerythritol with a trace of di-ester. The O-E-2 was principally mono- and di-esters of pentaerythritol with a trace of tri-ester. The O-E-1 fraction had a melting point of from 54° C. to 58° C. The O-E-2 fraction had a melting point of from 53° C. to 56° C.

The commercially available blend of pentaerythritol stearate esters of Example 1 (Radiasurf™ 7174 from Oleon) was also recrystallized from a mixture of 60% ethanol and 40% water to provide a first fraction (designated O-E60-1) and a second fraction (designated O-E60-2). The O-E60-1 was principally tetra-, tri- and di-esters of pentaerythritol. The O-E60-2 was principally mono-ester of pentaerythritol. In this manner, 434 grams of the Radiasurf™ 7174 pentaerythritol stearate was recrystallized to yield 19.6 grams of pentaerythritol monostearate (yield 4.5%) having a melting point of from 60° C. to 72° C.

The commercially available blend of pentaerythritol stearate esters of Example 1 was also separated by preparative scale column chromatography. A 4.0×17.0 cm Michel-Miller column (RTSI-240) was packed with 80 g normal phase silica gel. The column was loaded with 1 g of the ester blend pre-adsorbed on silica gel. The mixture was separated into four pure ester fractions as determined by TLC, GPC and LC/MS using a two step solvent gradient starting from pure hexane and ramping to 11% ethyl acetate (~25 mL fractions, ~830 mL total) followed by a second gradient from 40% ethyl acetate/60% hexane to 100% ethyl acetate (~25 mL fractions, ~1100 mL total). The following melting points were obtained: pentaerythritol tetra-ester, mp=64-69° C. (designated O-Tetra-CC); pentaerythritol tri-ester, mp=52-57° C. (designated O-Tri-CC); pentaerythritol di-ester, mp=60-65° C. (designated O-Di-CC); and pentaerythritol mono-ester, mp=57-64° C. (designated O-Mono-CC).

To make each of Examples 19-24 intercalated layered silicates and the Compare 2 sample, 40.0 g of purified montmorillonite (Cloisite Na+, Southern Clay Products) was placed in a bowl. With hand agitation, about 20 g of water was added drop wise until the consistency of small pebbles was obtained. Molten selected pentaerythritol ester (Examples 19-24, Compare 2) in an amount identified in Table 4 or the pentaerythritol was slowly added to the clay with mixing. The clay mixture was transferred to a 60 cc Brabender mixing chamber equipped with cam blades heated to 75° C. (higher temperatures were used for higher melting intercalating agents). The mixture was processed for 15 minutes at 100 rpm. The resulting intercalated layered silicates had an organic content of from about 20 to about 40%.

Each of the resulting intercalated layered silicates (Examples 19-24), the O-Tetra-CC (Compare 2), and the pentaerythritol/clay sample (Compare 3) were dried at 80° C. overnight, ground and sieved through a 325 mesh sieve. The average interlayer spacing (i.e., the basal d-spacing) of the resulting intercalated layered silicate or sample was determined as in Example 1. The results are reported in Table 4.

TABLE 4

| Example | Intercalating Agent | Wt. ratio of ester blend to montmorillonite | Primary d-spacing (Å) |
|---|---|---|---|
| 19 | O-E-1 | 0.42:1 | 53.49** |
| 20 | O-E-2 | 0.42:1 | 59.64 |
| Compare 2 | O-Tetra-CC | 1.13:1 | 48.64** |
| 21 | O-Tri-CC | 0.88:1 | 53.13** |
| 22 | O-Di-CC | 0.63:1 | 62.61 |
| 23 | O-Mono-CC | 0.37:1 | 46.95 |
| 24 | Radiasurf™ 7174 (Oleon) | 0.42:1 | 65.63 |
| Compare 3 | Pentaerythritol | | 15.06 |
| 25 | Tris-SA | 0.40:1 | 55.35 |

**It is believed that these reported d-spacings may be due to crystallized pentaerythritol tetra-ester and/or pentaerythritol tri-ester.

Example 25

The intercalating agent N-tris(hydroxymethyl)methyl stearamide was synthesized by direct amidation of tris(hydroxymethyl)aminomethane with stearic acid at 85-125° C. in ethanol water mixture with the removal of solvent using a Dean-Stark trap. The product obtained was a white solid. Yield was 54 wt. %, mp=89-101° C. By this method essentially pure N-tris(hydroxymethyl)methyl stearamide (designated Tris-SA) was obtained.

An intercalated layered silicate was made following the procedure set forth for Examples 19-25 above, but utilizing the Tris-SA as the intercalating agent. The resulting Example 25 intercalated layered silicate was tested as set forth for Examples 19-24 above. The results are reported in Table 4.

Examples 26-39

The intercalated layered silicate of Example 2 was mixed with various matrix polymers at the weight % loading levels shown in Table 5 to make the dispersed-particle compositions of Examples 26-39, as shown in Table 5. Each mixture was compounded for 10 minutes at temperatures ranging from 145-210° C. using a Haake Rheomix 600 Bowl Mixer operating at 50 rpm mixer speed. Each of the resulting Examples 26-39 dispersed-particle compositions were pressed on a Carver press between two glass plates into a transparent film having a thickness of about 100 microns. The thermo-mechanical properties of the dispersed particle compositions were then evaluated via dynamic mechanical analysis using a RSA-11 Solids Analyzer. Samples of the films of each of the dispersed particle compositions were made having dimensions of 3 mm wide by 30 mm long. These samples were mounted and evaluated by the procedures outlined in ASTM D 4065-89 and ASTM 5026-90. The temperature was ramped at 3° C. increments with 30 seconds delay after each step to ensure thermal equilibrium. The annular frequency was 22 rad/sec and strain was 0.2%. The storage modulus results are summarized in Table 5. The matrix polymers without intercalated layered silicate were also evaluated (Compare 4-7).

TABLE 5

| | Matrix Medium | Intercalated Layered Silicate Loading (wt. %) | Modulus values (×10E8 dynes/cm$^2$) | | | | |
|---|---|---|---|---|---|---|---|
| | | | E' 0° C. | E' 22° C. | E' 50° C. | E' 100° C. | E' 150° C. |
| Compare 4 | LLDPE | 0 | 57 | 36 | 14 | 2.2 | |
| Ex 26 | LLDPE | 2.5 | 62 | 41 | 17 | 2.4 | |
| Ex 27 | LLDPE | 5.0 | 61 | 40 | 15 | 2.4 | |
| Ex 28 | LLDPE | 7.5 | 67 | 42 | 16 | 2.4 | |
| Ex 29 | LLDPE | 15.0 | 72 | 45 | 16 | 2.6 | |
| Compare 5 | PP | 0 | 185 | 133 | 78 | 30 | 6.1 |
| Ex 30 | PP | 2.5 | 200 | 134 | 78 | 32 | 7.5 |
| Ex 31 | PP | 5.0 | 230 | 154 | 85 | 35 | 8.6 |
| Ex 32 | PP | 7.5 | 215 | 149 | 85 | 34 | 8.5 |
| Ex 33 | PP | 15.0 | 212 | 150 | 83 | 36 | 9.2 |
| Compare 6 | PA6 | 0 | 129 | 99 | 64 | 40 | 29 |
| Ex 34 | PA6 | 2.5 | 222 | 187 | 96 | 51 | 35 |
| Ex 35 | PA6 | 5.0 | 223 | 161 | 93 | 65 | 45 |
| Compare 7 | EVOH | 0 | 280 | 258 | 105 | 41 | 12 |
| Ex 36 | EVOH | 2.5 | 291 | 262 | 120 | 41 | 13 |
| Ex 37 | EVOH | 5.0 | 334 | 302 | 122 | 43 | 14 |
| Ex 38 | EVOH | 7.5 | 317 | 285 | 122 | 43 | 15 |
| Ex 39 | EVOH | 15.0 | 325 | 289 | 120 | 47 | 16 |

The LLDPE, PP, EVA, and PA6 for the matrix polymer identified in Table 5 were the same as those polymers identified in Examples 3-6, respectively.

Comparative Sample 8

Figure 10:
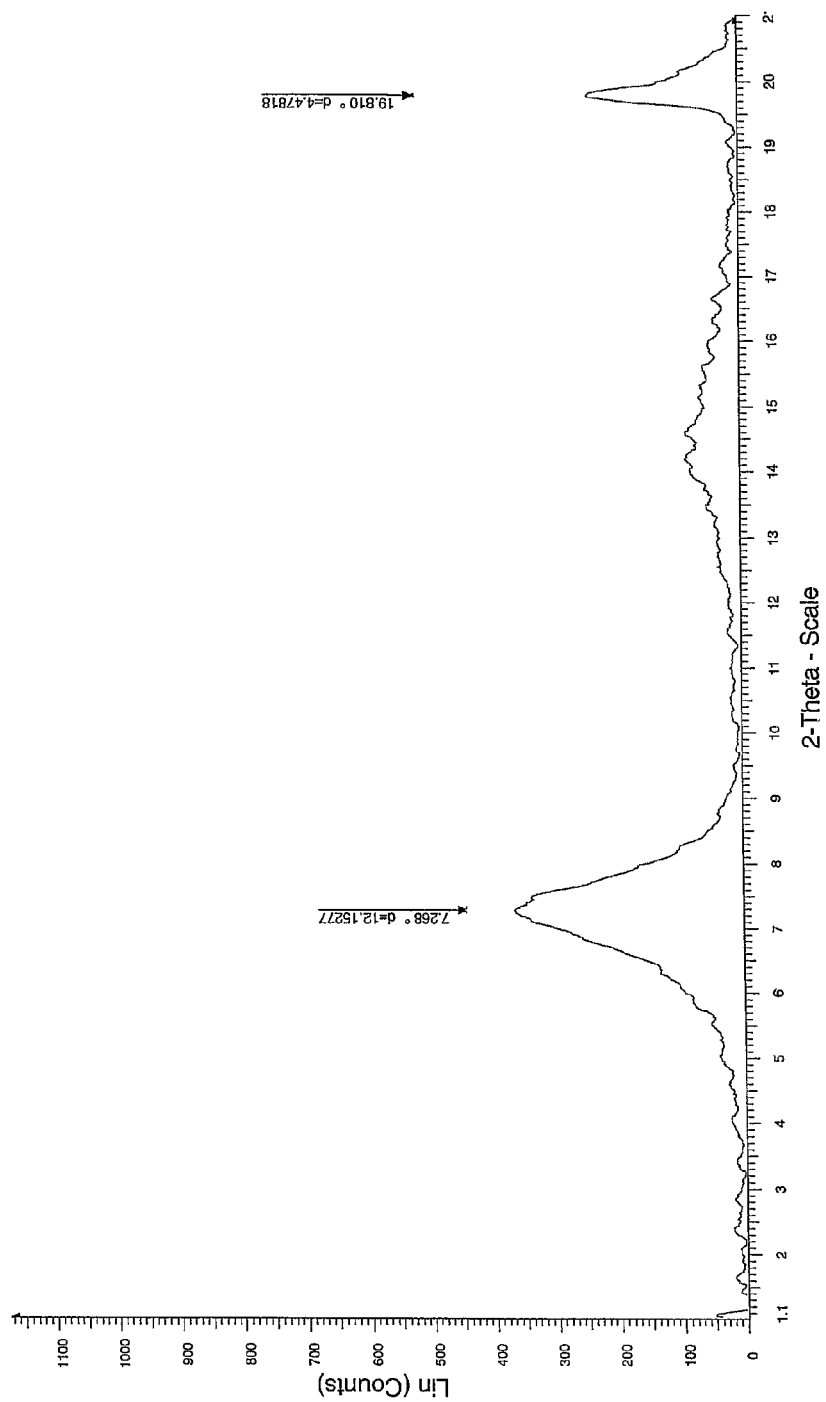
FIG. 10 is an X-ray diffraction pattern for non-intercalated montmorillonite clay.

FIG. 10 shows the diffraction pattern for a Comparative Sample 8 composition that was made containing 30 weight % non-intercalated montmorillonite clay suspended in a matrix of ethylene vinyl acetate wax (Honeywell Corporation under the trade name A-C 400A). The pattern indicated a diffraction peak at a 2θ of 7.27°, which calculates to an average interlayer spacing (i.e., the primary basal d-spacing) for the montmorillonite clay of 12.2 Å, measured and calculated as set forth above.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. An intercalated layered silicate comprising:
   a layered silicate comprising a plurality of silicate layers; and
   at least one intercalating agent sorbed between the silicate layers in an amount effective to provide an average interlayer spacing between the silicate layers of at least about 20 Å, wherein the at least one intercalating agent has a formula selected from the group consisting of:

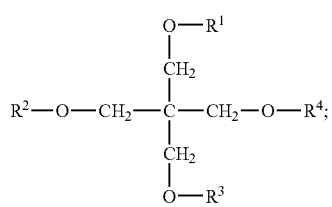

(I)

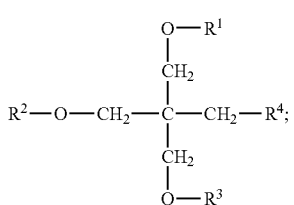

(II)

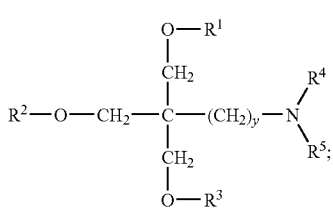

(III)

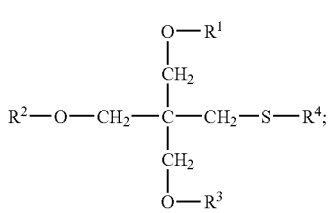

(IV)

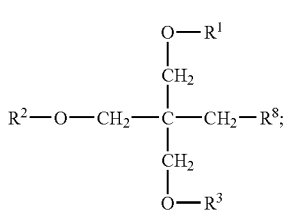

(V)

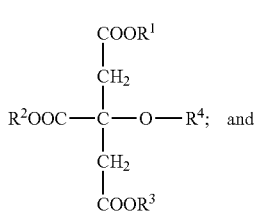

(VI)

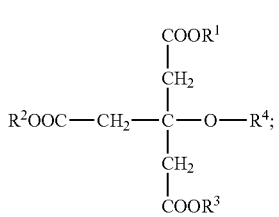

(VII)

wherein:

$R^4$ represents any of:

1) an acyl group having at least 8 carbon atoms;

2) an alkyl group having at least 8 carbon atoms;

3) an alkenyl group having at least 8 carbon atoms;

4) an alkadienyl group having at least 8 carbon atoms; and 5) a carbon chain group having at least 8 carbon atoms, wherein the carbon chain group incorporates one or more pendant or terminal groups selected from the group consisting of hydroxyl, carboxyl, epoxy, isocyanate, aryl, and arylmethyl, wherein the arylmethyl group has the formula

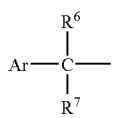

wherein "Ar" represents an aryl group, and $R^6$ and $R^7$ independently represent hydrogen, an acyl group, an alkyl group, or an alkenyl group;

$R^5$ represents H, —$CH_3$, —$CH_2CH_3$, or any of the groups represented by $R^4$;

$R^8$ represents an oxylated group having a formula selected from the group consisting of:

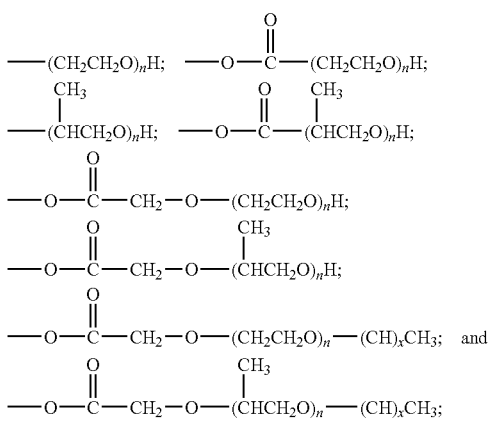

wherein "n" ranges from 2 to 12, "x" ranges from 4 to 14, and "y" ranges from 0 to 3; and $R^1$, $R^2$, and $R^3$ each independently represents H, —$CH_3$, —$CH_2CH_3$,

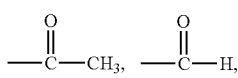

or any of the groups represented by $R^4$ and $R^8$, provided that at least one of $R^1$, $R^2$, and $R^3$ is H.

2. The intercalated layered silicate of claim 1 wherein the at least one intercalating agent has the formula I.

3. The intercalated layered silicate of claim 1 wherein the at least one intercalating agent has the formula II.

4. The intercalated layered silicate of claim 1 wherein the at least one intercalating agent has the formula III.

5. The intercalated layered silicate of claim 1 wherein the at least one intercalating agent has the formula IV.

6. The intercalated layered silicate of claim 1 wherein the at least one intercalating agent has the formula V.

7. The intercalated layered silicate of claim 1 wherein the at least one intercalating agent has the formula V and $R^8$ represents an oxylated group having a formula selected from the group consisting of:

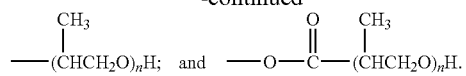

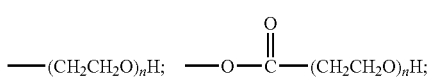

8. The intercalated layered silicate of claim 1 wherein the at least one intercalating agent has the formula VI.

9. The intercalated layered silicate of claim 1 wherein the at least one intercalating agent has the formula VII.

10. The intercalated layered silicate of claim 1 wherein $R^4$ is branched.

11. The intercalated layered silicate of claim 1 wherein $R^4$ is unbranched.

12. The intercalated layered silicate of claim 1 wherein $R^4$ is an acyl group.

13. The intercalated layered silicate of claim 1 wherein $R^4$ is an alkyl group.

14. The intercalated layered silicate of claim 1 wherein each of $R^1$, $R^2$, and $R^3$ is a hydrogen.

15. The intercalated layered silicate of claim 1 wherein only two of $R^1$, $R^2$, and $R^3$ is a hydrogen.

16. The intercalated layered silicate of claim 1 wherein only one of $R^1$, $R^2$, and $R^3$ is a hydrogen.

17. The intercalated layered silicate of claim 1 wherein the at least one intercalating agent comprises an ester of pentaerythritol.

18. The intercalated layered silicate of claim 1 wherein the at least one intercalating agent comprises a fatty acid ester of pentaerythritol.

19. The intercalated layered silicate of claim 1 wherein the at least one intercalating agent comprises a mono-ester of pentaerythritol.

20. The intercalated layered silicate of claim 1 wherein the at least one intercalating agent comprises a di-ester of pentaerythritol.

21. The intercalated layered silicate of claim 1 wherein the at least one intercalating agent comprises a tri-ester of pentaerythritol.

22. The intercalated layered silicate of claim 1 wherein the intercalating agent comprises pentaerythritol monostearate.

23. The intercalated layered silicate of claim 1 wherein the intercalating agent comprises an ester of citric acid.

24. The intercalated layered silicate of claim 1 wherein the intercalating agent comprises a fatty acid ester of citric acid.

25. The intercalated layered silicate of claim 1 wherein the intercalating agent comprises stearyl citrate.

26. The intercalated layered silicate of claim 1 wherein the intercalated layered silicate is essentially free of an intercalating agent comprising an ammonium compound.

27. The intercalated layered silicate of claim 1 wherein the intercalated layered silicate is essentially free of an intercalating agent comprising onium functionality.

28. The intercalated layered silicate of claim 1 wherein the amount of sorbed intercalating agent is at least about 5 weight parts per 100 weight parts layered silicate.

29. The intercalated layered silicate of claim 1 comprising first and second intercalating agents sorbed between the silicate layers in an amount effective to provide an average interlayer spacing between the silicate layers of at least about 20 Å, wherein:
the first and second intercalating agents are different from each other; and
the first and second intercalating agents are each independently represented by formulas selected from the group consisting of formulas I through VII.

30. The intercalated layered silicate of claim 29 wherein the weight ratio of the second intercalating agent to the first intercalating agent is at least about 1:20.

31. The intercalated layered silicate of claim 1 comprising first and second intercalating agents sorbed between the silicate layers in an amount effective to provide an average interlayer spacing between the silicate layers of at least about 20 Å, wherein:
- the first and second intercalating agents are different from each other; and
- the first and second intercalating agents are each independently represented by formula I.

32. The intercalated layered silicate of claim 1 comprising first, second, and third intercalating agents sorbed between the silicate layers in an amount effective to provide an average interlayer spacing between the silicate layers of at least about 20 Å, wherein:
- the first, second, and third intercalating agents are different from each other; and
- the first, second, and third intercalating agents are each independently represented by formulas selected from the group consisting of formulas I through VII.

33. The intercalated layered silicate of claim 32 wherein:
- the weight ratio of the second intercalating agent to the first intercalating agent is at least about 1:20; and
- the weight ratio of the third intercalating agent to the first intercalating agent is at least about 1:20.

34. The intercalated layered silicate of claim 1 comprising first, second, and third intercalating agents sorbed between the silicate layers in an amount effective to provide an average interlayer spacing between the silicate layers of at least about 20 Å, wherein:
- the first, second, and third intercalating agents are different from each other; and
- the first, second, and third intercalating agents are each independently represented by formula I.

35. The intercalated layered silicate of claim 1 wherein the average interlayer spacing between the silicate layers is at least about 30 Å.

36. The intercalated layered silicate of claim 1 wherein the layered silicate is a bentonite clay.

37. The intercalated layered silicate of claim 1 having a peak degradation temperature of at least about 360° C.

38. The intercalated layered silicate of claim 1 further comprising at least one intercalant fill agent dispersed between the silicate layers wherein:
- the at least one intercalant fill agent is represented by a formula selected from the group consisting of formulas I through VII wherein for the at least one intercalant fill agent at least two of $R^1$, $R^2$, and $R^3$ each independently represents any of the groups represented by $R^4$ and $R^8$ and without the proviso that at least one of $R^1$, $R^2$, and $R^3$ is hydrogen.

39. The intercalated layered silicate of claim 38 wherein for the at least one intercalant fill agent, each of $R^1$, $R^2$, and $R^3$ independently represents any of the groups represented by $R^4$ and $R^8$.

40. The intercalated layered silicate of claim 38 wherein the intercalant fill agent is a tetra-ester of pentaerythritol.

41. The intercalated layered silicate of claim 38 wherein the intercalant fill agent is a tetra-fatty acid ester of pentaerythritol.

42. The intercalated layered silicate of claim 38 wherein the weight ratio of the total amount of the at least one intercalant fill agent to the total amount of the at least one intercalating agent in the intercalated layered silicate is at least about 1:20.

43. A method of exfoliating a layered silicate comprising:
- mixing from about 0.1 to about 100 weight parts of the intercalated layered silicate of claim 1 with 100 weight parts of a matrix medium to form a mixture; and
- adding sufficient energy to the mixture to form a dispersed-particle composition comprising at least about 0.1 weight parts exfoliated particles per 100 weight parts matrix medium.

44. The method of claim 43 wherein the exfoliated particles have an average dimension in the shortest dimension of at most about 100 nm.

45. The method of claim 43 wherein the matrix medium comprises one or more polymers selected from the group consisting of polyolefin, ethylene/vinyl alcohol copolymer, ionomer, vinyl plastic, polyamide, polyester, and polystyrene.

46. The method of claim 43 wherein the matrix medium comprises one or more energy curable polymer precursors.

47. The method of claim 43 wherein the matrix medium comprises one or more materials selected from the group consisting of coating solvents, coating binders, and coating resins.

48. The method of claim 43 wherein the matrix medium comprises one or more materials selected from the group consisting of ink solvents and ink resins.

49. The method of claim 43 wherein the matrix medium comprises one or more materials selected from the group consisting of grease lubricating oils and grease gelling agents.

50. The method of claim 43 wherein the matrix medium comprises one or more materials selected from the group consisting of cosmetic lipids, cosmetic emollients, cosmetic humectants, cosmetic film formers, cosmetic binders, cosmetic surfactants, and cosmetic solvents.

51. The method of claim 43 wherein the matrix medium comprises one or more pharmaceutical excipients.

52. The method of claim 43 wherein the matrix medium comprises an emulsion selected from the group consisting of an oil-in-water emulsion and a water-in-oil emulsion.

53. The method of claim 43 comprising mixing from about 1 to about 10 weight parts of the intercalated layered silicate of claim 1 with 100 weight parts of a matrix medium.

54. The method of claim 43 comprising adding sufficient energy to the mixture to form a dispersed-particle composition comprising at least about 1 weight parts exfoliated particles per 100 weight parts matrix medium.

55. A dispersed-particle composition comprising:
- at least about 50 weight % of a matrix medium; and
- from at least about 0.1 to at most about 50 weight % of particles dispersed in the matrix medium, the particles having an average size in the shortest dimension of at most about 100 nm, the particles comprising:
  - silicate platelets; and
  - an intercalating agent sorbed to the silicate platelets, the intercalating agent having a formula selected from the group consisting of formulas I through VII of claim 1.

56. The dispersed-particle composition of claim 55 wherein the matrix medium comprises one or more polymers selected from the group consisting of polyolefin, ethylene/vinyl alcohol copolymer, ionomer, vinyl plastic, polyamide, polyester, and polystyrene.

57. A packaged food comprising:
- a package comprising the dispersed-particle composition of claim 55; and
- a food enclosed in the package.

58. A packaging film comprising the dispersed-particle composition of claim 55, wherein the matrix medium comprises one or more polymers, wherein the one or more polymers are thermoplastic.

59. A method of packaging a food comprising:
enclosing a food in a package comprising the packaging film of claim 58.

* * * * *